(12) United States Patent
Hu et al.

(10) Patent No.: US 12,074,714 B2
(45) Date of Patent: Aug. 27, 2024

(54) METHODS AND APPARATUSES OF HANDLING COLLISIONS

(71) Applicant: LENOVO (BEIJING) LIMITED, Beijing (CN)

(72) Inventors: Jie Hu, Beijing (CN); Jing Han, Beijing (CN); Haiming Wang, Beijing (CN); Lianhai Wu, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 17/627,361

(22) PCT Filed: Jul. 18, 2019

(86) PCT No.: PCT/CN2019/096616
§ 371 (c)(1),
(2) Date: Jan. 14, 2022

(87) PCT Pub. No.: WO2021/007867
PCT Pub. Date: Jan. 21, 2021

(65) Prior Publication Data
US 2022/0271872 A1    Aug. 25, 2022

(51) Int. Cl.
*H04L 1/1829*  (2023.01)
*H04L 1/1867*  (2023.01)
*H04L 5/00*    (2006.01)
*H04W 74/0833* (2024.01)

(52) U.S. Cl.
CPC .......... *H04L 1/1835* (2013.01); *H04L 1/1848* (2013.01); *H04L 1/1864* (2013.01); *H04L 1/1887* (2013.01); *H04L 5/0053* (2013.01); *H04W 74/0858* (2013.01)

(58) Field of Classification Search
None
See application file for complete search history.

(56) References Cited

U.S. PATENT DOCUMENTS

| 2008/0232315 | A1  | 9/2008  | Bachl et al. |
| 2010/0284364 | A1* | 11/2010 | You .................. H04L 1/1887 370/330 |
| 2011/0045819 | A1  | 2/2011  | Lee et al. |

(Continued)

FOREIGN PATENT DOCUMENTS

| CN | 108521884 A  | 9/2018 |
| EP | 3512265 A1   | 7/2019 |

OTHER PUBLICATIONS

International Searching Authority, "Written Opinion of the International Searching Authority," PCT/CN2019/096616, Apr. 14, 2020, pp. 1-4.

(Continued)

*Primary Examiner* — Benjamin Lamont
(74) *Attorney, Agent, or Firm* — Kunzler Bean & Adamson

(57) ABSTRACT

The present disclosure relates to methods and apparatuses for handling collisions. A method includes receiving at a first communication equipment first scheduling information; determining whether there is a transmission resource collision of a first TB and a second TB; and storing the first TB or the second TB for transmission if the collision is determined.

16 Claims, 16 Drawing Sheets

(56) References Cited

U.S. PATENT DOCUMENTS

| | | | | |
|---|---|---|---|---|
| 2012/0155436 A1* | 6/2012 | Lindoff | ............... | H04W 72/535 |
| | | | | 370/336 |
| 2013/0322413 A1* | 12/2013 | Pelletier | ................ | H04L 5/0091 |
| | | | | 370/336 |
| 2016/0135239 A1* | 5/2016 | Khoryaev | ............. | H04W 72/04 |
| | | | | 370/329 |
| 2018/0013521 A1* | 1/2018 | Lee | ........................ | H04L 1/1851 |
| 2018/0351723 A1* | 12/2018 | Feng | ..................... | H04W 72/02 |
| 2019/0230689 A1* | 7/2019 | Cao | ........................ | H04L 1/0068 |
| 2020/0037343 A1* | 1/2020 | He | ......................... | H04L 5/0094 |
| 2020/0296706 A1* | 9/2020 | Du | ............................ | H04L 5/00 |
| 2022/0183050 A1* | 6/2022 | Marco | ................... | H04W 72/23 |

OTHER PUBLICATIONS

Intel Corporation, Analysis of Mutual Impact of WAN and D2D Communication, 3GPP TSG RAN WG1 Meeting #77, R1-142685, May 19-23, 2014, pp. 1-7, Seoul, Korea.

LG Electronics, Discussion on resource confict between PUSCHs, 3GPP TSG RAN WG1 #97, R1-1906670, May 13-17, 2019, Reno, USA.

* cited by examiner

METHODS AND APPARATUSES OF HANDLING COLLISIONS

TECHNICAL FIELD

The subject application generally relates to a wireless communication system, and more particularly, to methods and apparatuses of handling collisions in the wireless communication system.

BACKGROUND

A wireless communication system can include a base station (BS) and plurality of devices in communication with the base station. To reduce a communication load of a base station, one device, for example a vehicle or a User Equipment (UE), may communicate with another device, for example. another vehicle or UE using a direct radio link or a sidelink.

The term "sidelink" can also be referred to as device-to-device (D2D) communication link, which means one UE can communicate with another UE via a direct link without being forwarded by the BS. The D2D communication link may be used in any suitable telecommunication network in accordance with various standards.

Resources can be provided in the wireless communication system during D2D communication. However, a collision may occur during the D2D communication. Therefore, handling the discarded data after collision happens is a critical issue.

SUMMARY OF THE DISCLOSURE

In accordance with some embodiments of the subject application, a method is provided that includes receiving at a first communication equipment a first transmission resource scheduling information; determining whether there is a transmission resource collision of a first TB and a second TB; and storing the first TB or the second TB for retransmission if the collision is determined.

In accordance with some embodiments of the subject application, a method includes receiving from a first communication equipment first information indicating a transmission resource collision of a first TB and a second TB via sidelink communication and receiving from the first communication equipment request for retransmission of the first TB or the second TB.

In accordance with some embodiments of the subject application, an apparatus includes at least one non-transitory computer-readable medium having computer executable instructions stored therein. The apparatus further includes at least one receiver. The apparatus further includes at least one transmitter. The apparatus further includes at least one processor. The processor is coupled to the at least one non-transitory computer-readable medium, the at least one receiver and the at least one transmitter. The at least one non-transitory computer-readable medium and the computer executable instructions are configured, with the at least one processor, cause the apparatus to implement the above methods.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only example embodiments of the disclosure and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Figure 1:
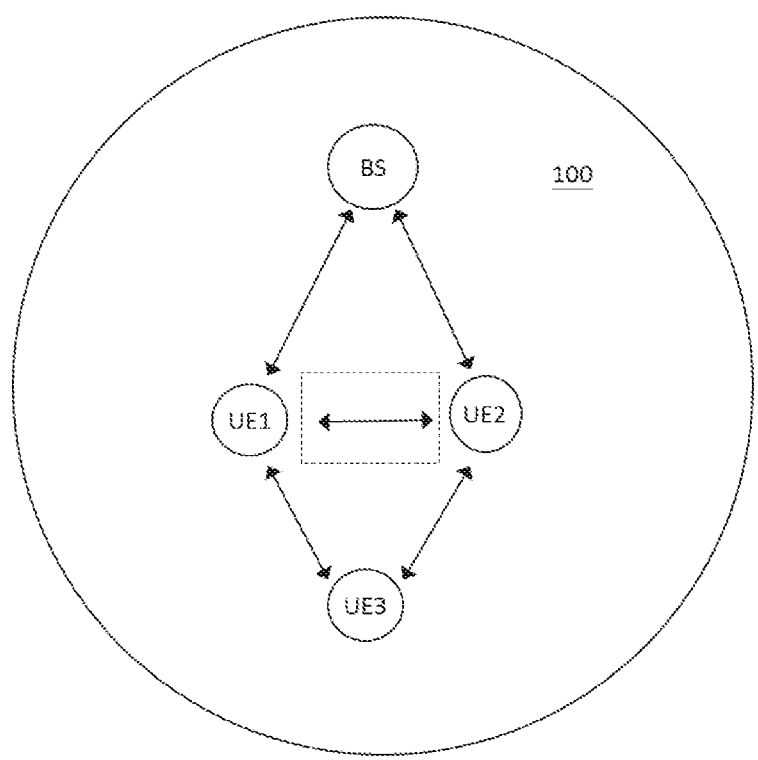
FIG. 1 illustrates a wireless communication system in accordance with some embodiments of the subject application.

FIG. 1 illustrates a wireless communication system 100 in accordance with some embodiments of the subject application.

Referring to FIG. 1, the wireless communication system 1 includes a base station BS, a user equipment UE1, a user equipment UE2 and a user equipment UE3. Although, merely for simplicity, one base station is illustrated in FIG. 1, it is contemplated that the wireless communication system 100 may include more base stations. Although, merely for simplicity, only the UE1, the UE2 and the UE3 are illustrated in FIG. 1, it is contemplated that the wireless communication system 100 may include more or less UEs.

For example, the BS may operate in compliance with standard protocols such as a Long-Term Evolution (LTE)

protocol, a LTE-Advanced (LTE-A) protocol, a New Radio (NR protocol or other suitable protocols.

The UE1 may represent, for example, but is not limited to, a computing device, a wearable device, a mobile device, an IoT device, a vehicle having at least a transceiver, and etc. . . . . Each of the UE2 and the UE3 may represent a device that is the same or similar to the UE1. Each of the UE2 and the UE3 may also include a device different from the UE1. Persons skilled in the art should understand that as the technology develops and advances, the terminology described in the present disclosure may change and should not affect or limit principle and spirit in the present disclosure.

Figure 2:
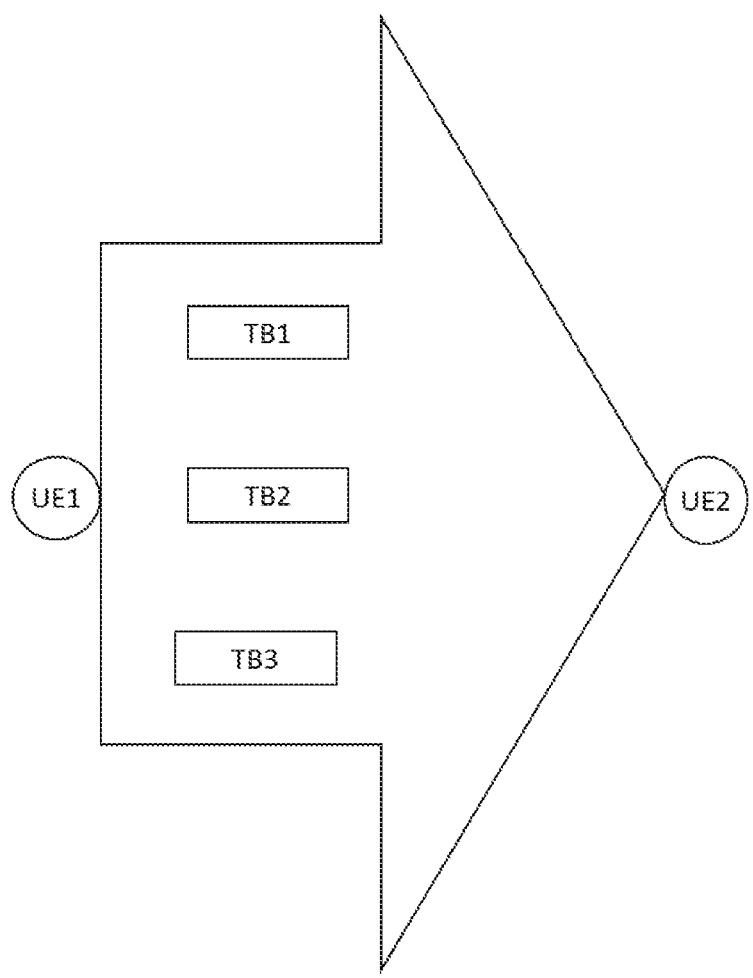
FIG. 2 illustrates a sidelink connection in accordance with some embodiments of the subject application.

FIG. 2 illustrates a sidelink connection in accordance with some embodiments of the subject application.

FIG. 2 depicts a sidelink established between the UE1 and the UE2 as shown in FIG. 1 with the UE1 functioning as a transmitting UE.

The UE1 can transmit transport blocks or transmission blocks (TBs) of service data (e.g. TB1, TB2, TB3) to the UE2 via a sidelink. The UE2 may function as a receiving UE during the sidelink communication between the UE1 and the UE2 to receive the TBs of service data from the UE1. The arrow which encloses the TB1, the TB2 and the TB3 may represent transmission resources used for transmitting the TB1, the TB2 and the TB3. It is contemplated that the UE1 may transmit more or less TBs to the UE1 during sidelink communication.

It is contemplated that the UE1 may also function as a receiving UE and the UE2 may function as a transmitting UE during sidelink communication. It is also contemplated that a sidelink communication can be established between the UE2 and the UE3 as shown FIG. 1. It is also contemplated that a sidelink communication can be established between the UE1 and the UE3 as shown FIG. 1.

Figure 3:
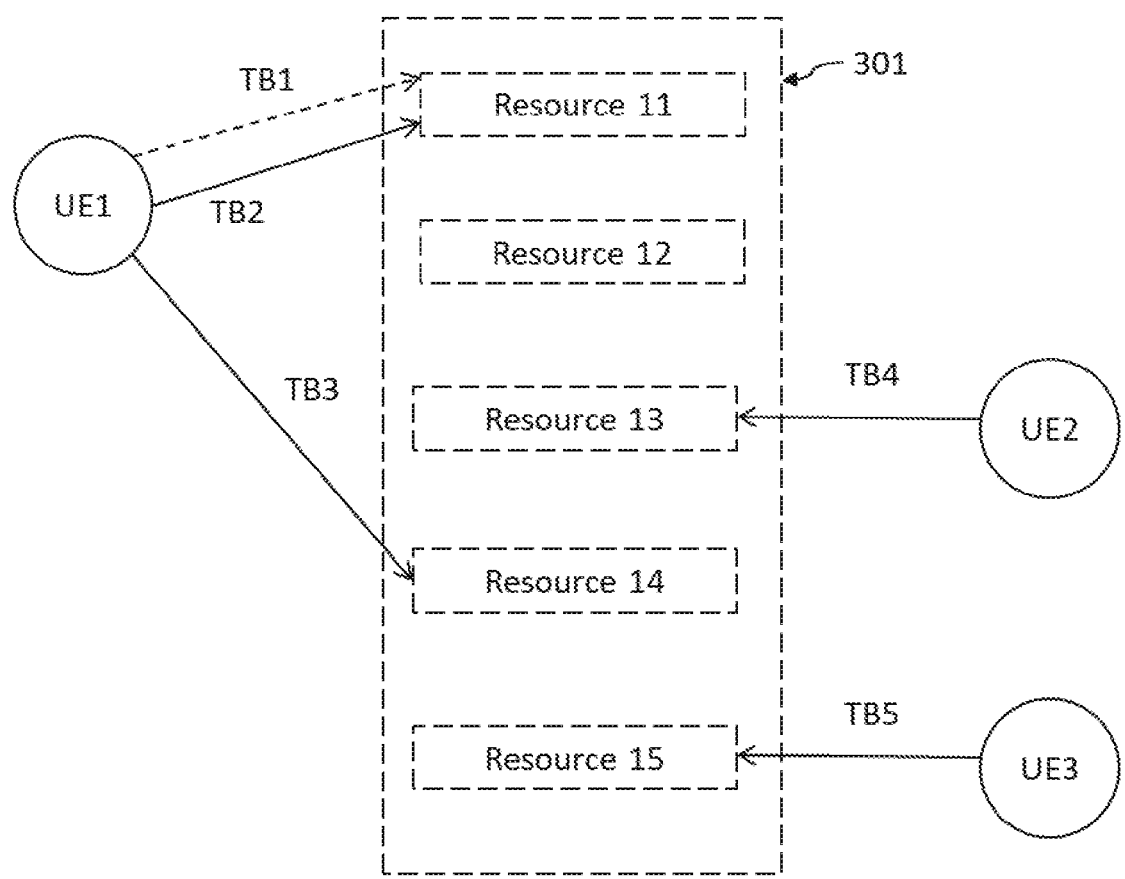
FIG. 3 illustrates resource configuration in a wireless communication system in accordance with some embodiments of the subject application.

FIG. 3 illustrates resource configuration in a wireless communication system in accordance with some embodiments of the subject application.

Referring to FIG. 3, a resource pool 301 can include resource 11, resource 12, resource 13, resource 14 and resource 15.

Before transmitting the TB1, the TB2 and the TB3 to the UE2 via a sidelink as shown in FIG. 2, the UE1 can select some resource(s) or available resource(s) for sidelink communication.

For example, the resource 13, which is used by the UE2, may not be available to the UE1. The resource 15, which is used by the UE3, may not be also available to the UE1. In other words, resources 11, 12, and 14 that are not used by UE(s) other than the UE1, can be available to the UE1 to be used for sidelink communication.

For example, the UE1 can select the resource 11 to transmit the TB2 to the UE2. Similarly, the UE1 can select the resource 14 to transmit the TB3 to the UE2 as shown in FIG. 2.

In addition, the BS as shown in FIG. 1 can also schedule resource(s) in the resource pool 301 for sidelink communication of the UE1. For example, the BS can schedule the resource 11 for the UE1 to transmit the TB1 to the UE2, as shown in dotted arrow. Such selection by the BS, will cause a collision to occur on the resource 11, which is selected by UE1 to transmit TB2 and is scheduled by BS to transmit TB1 at a same time (or time window).

Figure 4A:
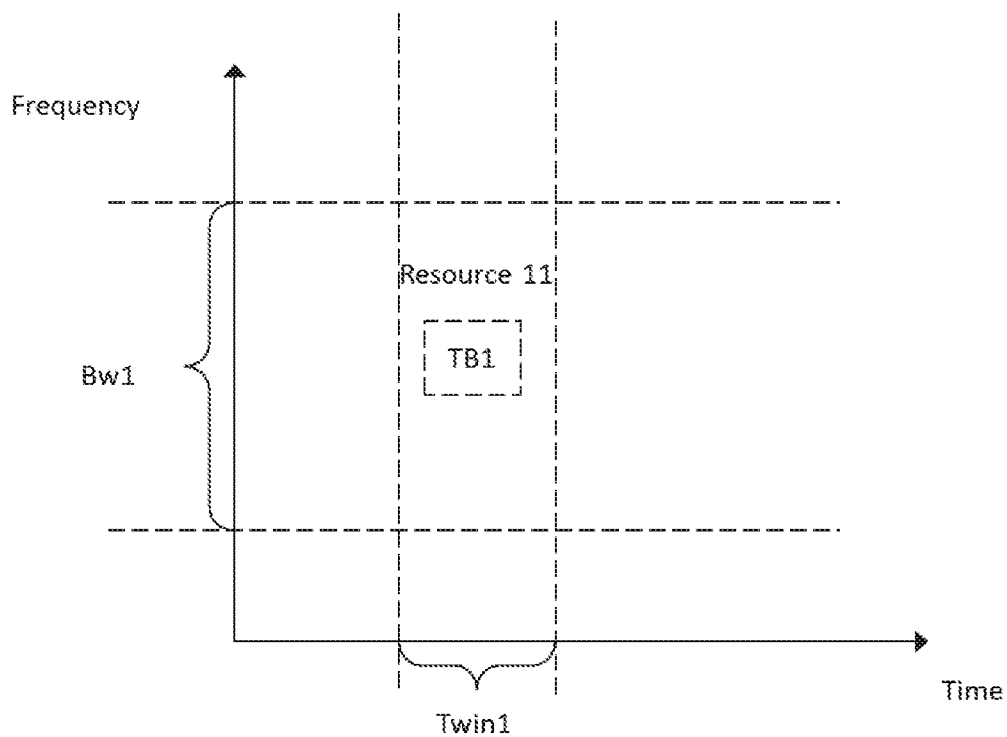
FIG. 4A illustrates transmission of TB1 on resource 11 as shown in FIG. 3.

FIG. 4A illustrates transmission of the TB1 on the resource 11 shown in FIG. 3.

Referring to FIG. 4A, the resource 11 can be referred to as a bandwidth Bw1 available for data transmission in a time window Twin1. As shown in FIG. 3, the resource 11 is scheduled by BS for the UE1 to transmit the TB1.

Figure 4B:
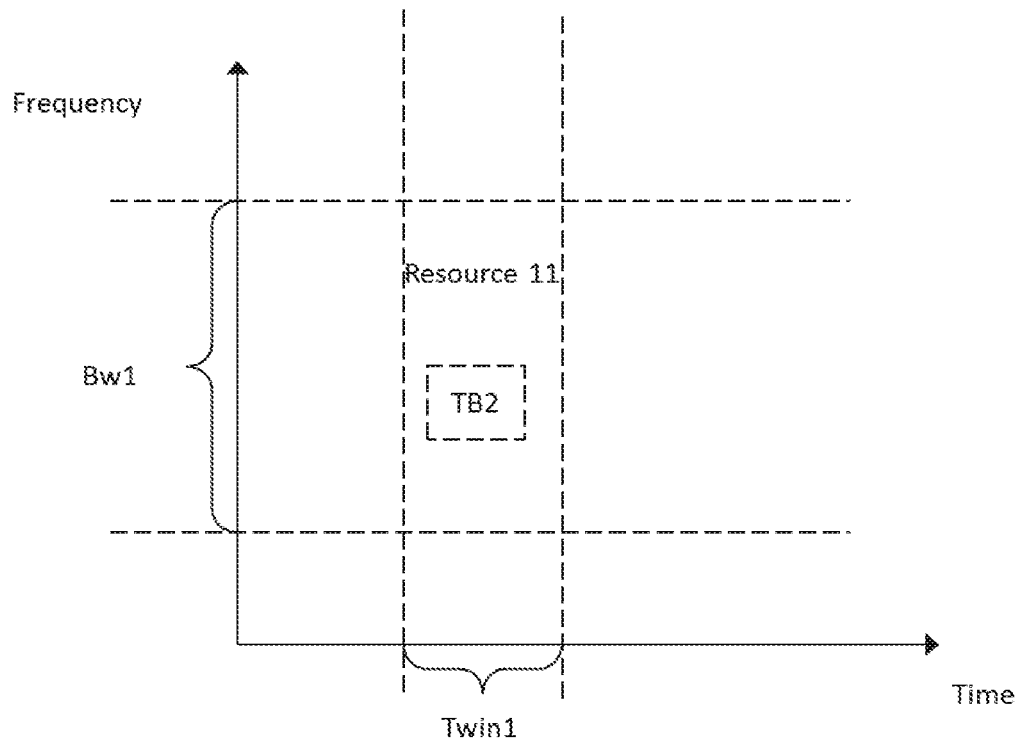
FIG. 4B illustrates transmission of TB2 on resource 11 as shown in FIG. 3.

FIG. 4B illustrates transmission of the TB2 on the resource 11 shown in FIG. 3.

Referring to FIG. 4B, the resource 11 can be referred to as a bandwidth Bw1 available for data transmission in a time window Twin1. As shown in FIG. 3, the resource 11 is autonomously selected by the UE1 to transmit the TB2.

Figure 4C:
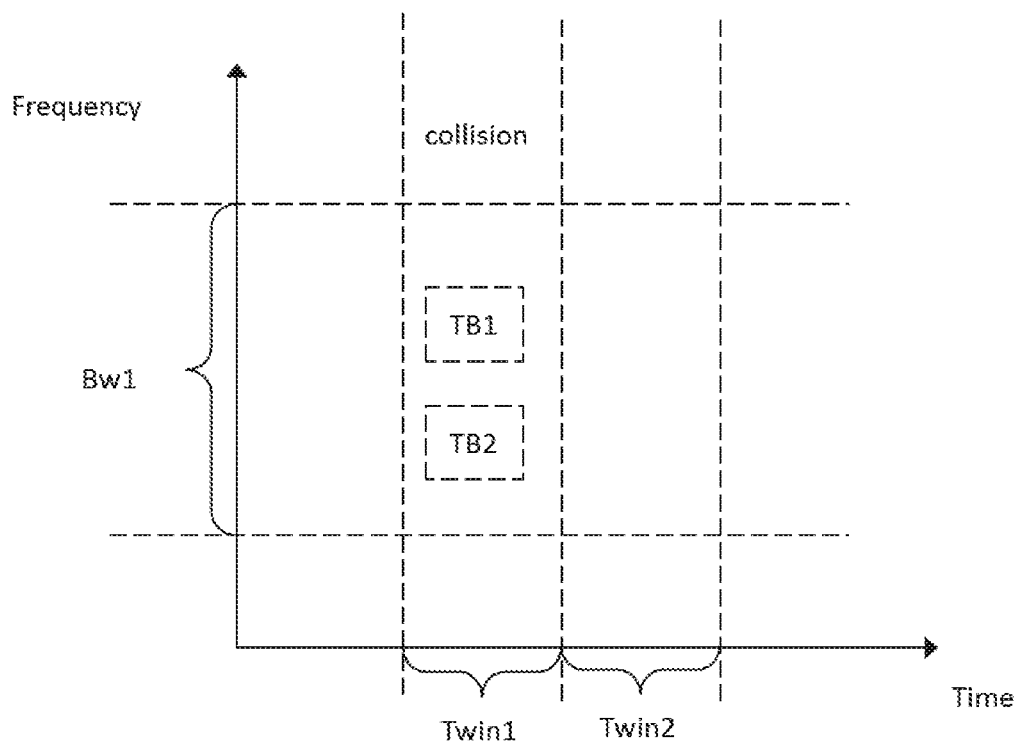
FIG. 4C illustrates a collision on resource 11 as shown in FIG. 3.

FIG. 4C illustrates collision on resource 11 as shown in FIG. 3.

Referring to FIG. 4C, assuming UE can only support data transmission of one TB on a single resource due to limited capability, collision of TB1 and TB2 can occur on the resource 11, or say collision of the TB1 and the TB2 can happen in bandwidth Bw1 within time window Twin1. In other words, collision of the TB1 and the TB2 may result in data loss (e.g. loss of the TB1 or the TB2).

Figure 5:
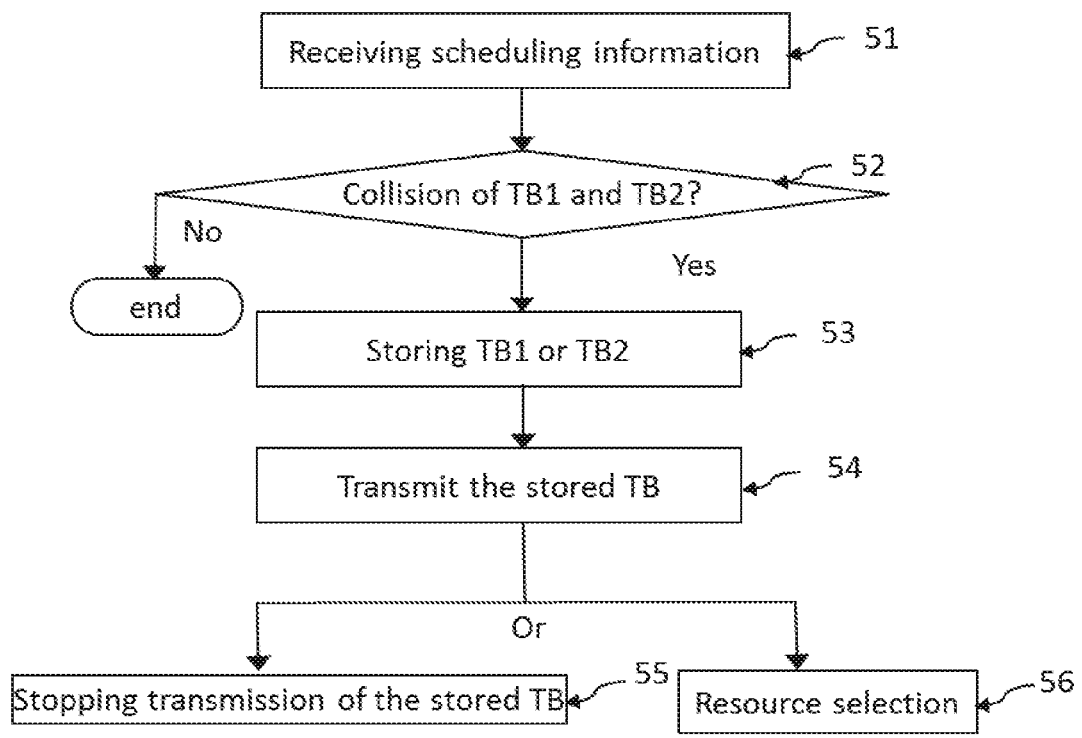
FIG. 5 illustrates a method of handling collisions in accordance with some embodiments of the subject application.

FIG. 5 illustrates a method of handling collisions in accordance with some embodiments of the subject application, for example, the collision as discussed above with respect to FIG. 3 or FIG. 4C. The method as shown in FIG. 5 can avoid discarding data (e.g. the TB1 or the TB2) or data loss when collision happens during the sidelink communication as shown in FIG. 4C.

In operation 51, the UE1 receives scheduling information from the BS. In some embodiments, the scheduling information may indicate that the TB1 is transmitted via the resource 11 scheduled by the BS.

After receiving the scheduling information in operation 51, the UE1 may determine whether a collision will occur when transmitting the TB1 and other TBs (e.g., TB2) in operation 52. For example, the UE1 may transmit the TB1 on the resource 11 after receiving the scheduling information. At the same time, since the UE1 also has selected to transmit TB2 on the resource 11, a collision of the TB1 and the TB2 will occur and is detected by the UE1. Since UE can only support transmission of one TB on a single resource due to limitation of capability, only one TB (e.g., the TB1 or the TB2) is prioritized for transmission. If the TB1 is determined to be discarded, the UE1 may store the TB1; or if the TB2 is determined to be discarded, the UE1 may store the TB2. That is, the UE1 may store either the TB1 or the TB2 in operation 53. It is contemplated that either the TB1 or the TB2 may be stored in a buffer. In some embodiments of the disclosure, the buffer will be a HARQ (Hybrid Automatic Repeat Request) buffer.

In operation 54, the UE1 transmits the stored TB. In some embodiments, as shown in FIG. 4C, the UE1 may use the resource with a bandwidth of Bw1 in a time window of Twin2 scheduled by the BS to transmit the stored TB1. In some embodiments, the UE1 may autonomously select a transmission resource with a bandwidth of Bw1 in a time window of Twin2 to transmit the stored TB1. Another collision may happen or occur when transmitting the stored TB1.

In some embodiments, if transmission of the stored TB fails, the UE1 may stop the transmission of the stored TB in operation 55. When the UE1 stops the transmission of the stored TB, the UE1 may flush the HARQ buffer to erase the stored TB. In some embodiments, the UE1 may transmit information to the BS indicating that the transmission of the stored TB has stopped and the HARQ buffer was flushed.

In some embodiments, if transmission of the stored TB fails, the UE1 may perform the resource detection and selection for transmission of the stored TB in operation 56.

Figure 6:
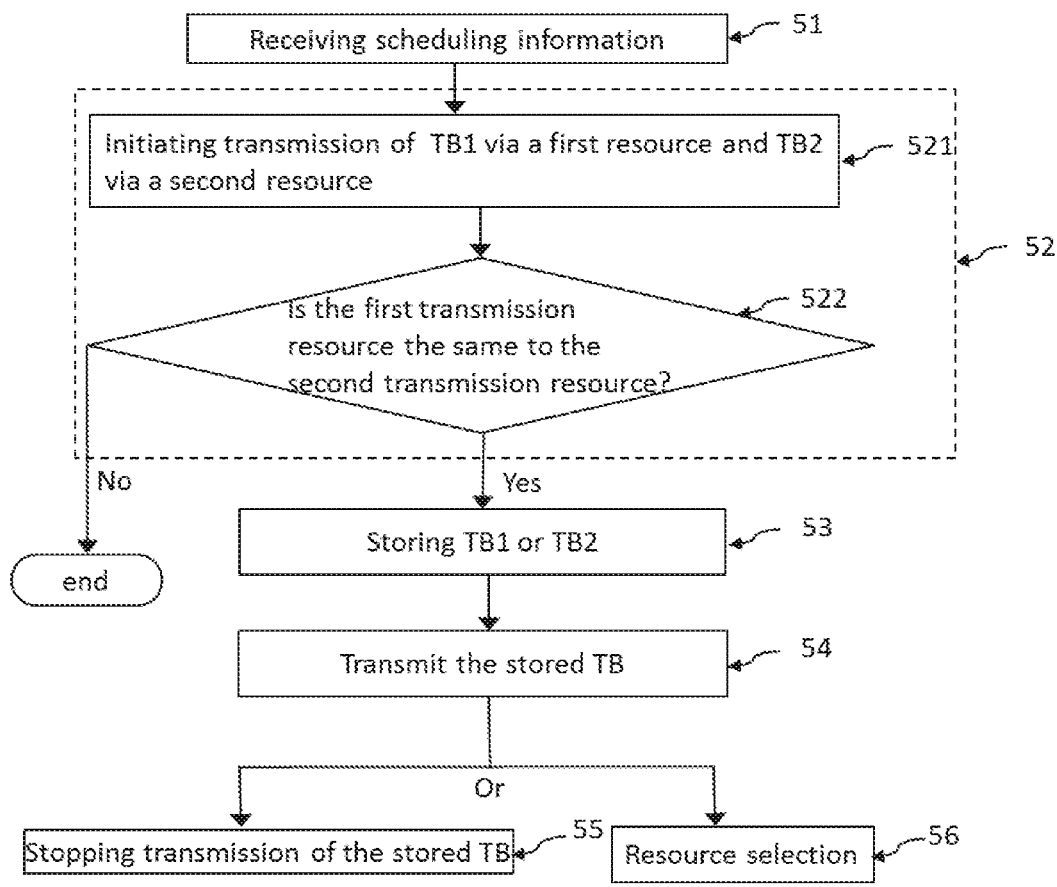
FIG. 6 illustrates another method of handling collisions in accordance with some other embodiments of the subject application.

FIG. 6 illustrates another method of handling collision in accordance with some embodiments, for example, the collision as discussed above with respect to FIG. 3 or FIG. 4C. The method as shown in FIG. 6 can avoid discarding data (e.g. the TB1 or the TB2) or data loss when collision happens during the sidelink communication as shown in FIG. 4C.

In the operation 51, the UE1 receives scheduling information from the BS. For example, the scheduling information may indicate that the TB1 is transmitted via the first transmission resource scheduled by BS.

In operation 52, the UE1 may determine whether a collision will occur when transmitting the TB1 and other TBs (e.g. TB2). The operation 52 includes an operation 521 and an operation 522.

In the operation 521, the UE1 may initiate transmission of the TB1 via a first transmission resource scheduled by the BS and the TB2 via the second transmission resource selected by the UE1 itself.

Subsequently, in the operation 522, the UE1 determines whether the first transmission resource is the same to the second transmission resource. If the first transmission resource is the same to the second transmission resource, a collision of the TB1 and the TB2 will occur and is detected by the UE1 as shown in FIG. 4C.

In operation 53, since UE can only support transmission of one TB on a single resource due to limitation of capability, the UE1 may store either the TB1 or the TB2. In some embodiments, the UE1 may store the TB1 if the TB is determined to be discarded. In some embodiments, the UE1 may store the TB2 if the TB2 is determined to be discarded.

In operation 54, the UE1 transmits the stored TB. In some embodiments, as shown in FIG. 4C, the UE1 may use the resource with a bandwidth of Bw1 in a time window of Twin2 scheduled by the BS to transmit the stored TB. In some embodiments, the UE1 may autonomously select a transmission resource with a bandwidth of Bw1 in a time window of Twin2 to transmit the stored TB. Another collision may happen or occur when transmitting the stored TB.

In some embodiments, if transmission of the stored TB fails, the UE1 may stop the transmission of the stored TB in operation 55. When the UE1 stops the transmission of the stored TB, the UE1 may flush the HARQ buffer to erase the stored TB. In some embodiments, the UE1 may transmit information to the BS indicating that the transmission of the stored TB has stopped and the HARQ buffer was flushed. In some embodiments, the UE1 may transmit during this step the information to the BS indicating that the transmission of the stored TB has stopped and the HARQ buffer was flushed.

In some embodiments, if transmission of the stored TB fails, the UE1 may perform the resource detection and selection for transmission of the stored TB in operation 56. In some embodiments, the UE1 may transmit during this step the information to the BS indicating that an available resource is selected for the stored TB.

Figure 7:
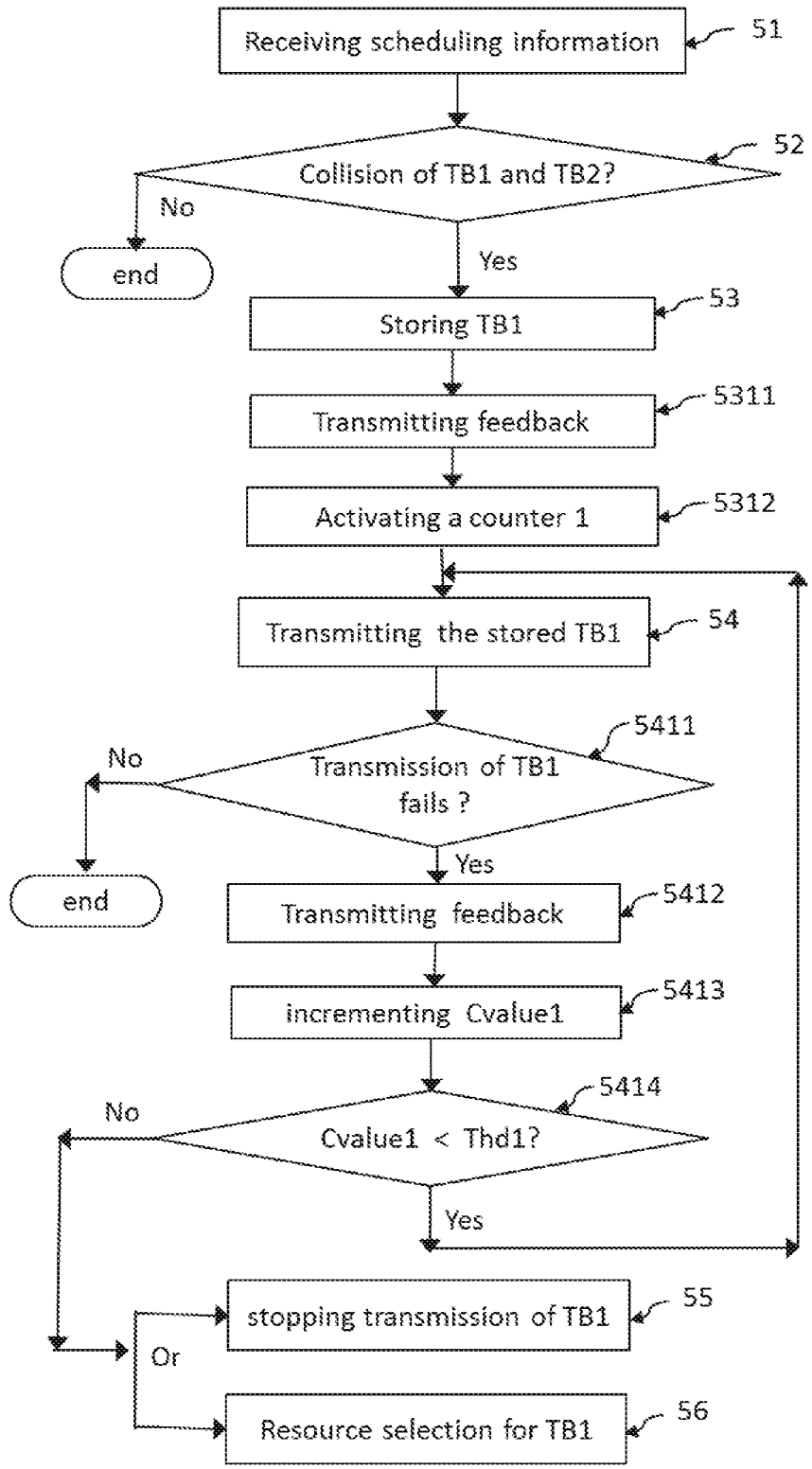
FIG. 7 illustrates another method of handling collisions in accordance with some other embodiments of the subject application.

FIG. 7 illustrates another method of handling collision in accordance with some embodiments, for example, the collision as discussed above with respect to FIG. 3 or FIG. 4C. The method as shown in FIG. 7 can avoid discarding data (e.g. the TB1 or the TB2) or data loss when collision happens during the sidelink communication as shown in FIG. 4C.

In operation 51, the UE1 receives scheduling information from the BS. In some embodiments, the scheduling information may indicate that the TB1 is transmitted via the resource 11 scheduled by the BS.

After receiving the scheduling information in operation 51, the UE1 may determine whether a collision will occur when transmitting the TB1 and other TBs (e.g., TB2) in operation 52. For example, the UE1 may initiate the transmission of the TB1 on the resource 11 after receiving the scheduling information. At the same time, since the UE1 also has selected to transmit the TB2 on the resource 11, a collision of the TB1 and the TB2 will occur and is detected by the UE1. Since UE can only support transmission of one TB on a single resource due to limitation of capability, the transmission of the TB1 may fail on the single resource and the UE1 may store, for example, the TB1 in operation 53.

In operation 5311, the UE1 transmits a feedback to the BS. In some embodiments, the feedback may refer to a HARQ negative-acknowledgement (NACK) feedback. When the collision of the TB1 and TB2 occurs in the operation 52, the UE1 itself will generate and transmit the HARQ NACK feedback to the BS. It is contemplated that the feedback not only refers to a HARQ NACK feedback, it may refer to any feedback for indicating a failure of transmission of a TB in any other form.

In some embodiments, the HARQ NACK feedback can be transmitted after the UE1 stores the TB1 in operation 53. In some embodiments, the HARQ NACK feedback can be transmitted before the UE1 stores the TB1 in operation 53. In some embodiments, the HARQ NACK feedback can be transmitted when the UE1 stores the TB1 in operation 53.

In some embodiments, the UE1 may reuse the configured resource to transmit the HARQ NACK feedback to the BS. The BS may know that the transmission of the TB1 fails in the UE1 after receiving the HARQ NACK feedback. The BS may schedule resource for transmission of the TB1. For example, the resource may refer to a bandwidth of Bw1 in a time window of Twin2 as illustrated in FIG. 4C.

In operation 5312, the UE1 activates or starts a counter 1. Once the counter 1 is activated or started, an original constant will be assigned to a counter value Cvalue1 of the counter 1. In some embodiments, the original constant can be assigned as 1, that is, the initial or original value of the Cvalue1 may be equal to 1.

In operation 54, the UE1 transmits the stored TB1. In some embodiments, the UE1 may use the resource with a bandwidth of Bw1 in a time window of Twin2 scheduled by the BS to transmit the stored TB1. In some embodiments, the UE1 may autonomously select a transmission resource to transmit the stored TB1. Another collision may happen or occur when transmitting the stored TB1.

In operation 5411, if the transmission of the TB1 fails, the UE1 transmits a HARQ NACK feedback to the BS in operation 5412. In some embodiments, the HARQ NACK feedback may be caused by a collision as shown in FIGS. 3 and 4C. In some embodiments, the HARQ NACK feedback may be caused by a radio link failure (RLF) between the UE1 and the UE2. It is contemplated that the HARQ NACK feedback may be caused by other disturbance or interference during the sidelink communication between the UE1 and the UE2.

Alternatively, in the operation 5411, if the transmission of the TB1 succeeds, the UE1 may receive a HARQ acknowledgement (ACK) feedback from the UE2, and will transmit or send the HARQ ACK feedback to the BS for indication of a successful transmission of the stored TB1. It is contemplated that the UE1 may transmit a feedback indicating a successful transmission of the stored TB1 in any other form.

In operation 5413, the UE1 increments the Cvalue1 according to the HARQ NACK feedback caused by all the above reasons. That is, the Cvalue1 represents or indicates the number of the HARQ NACK feedbacks caused by all the above reasons. For example, Cvalue1 is incremented with a constant of 1, that is, Cvalue1 is equal to 2 if the initial value of the Cvalue1 is equal to 1. In other words, the UE1 increases the Cvalue1 with an increment of 1. For example, after transmission fails in the operation 5411, the Cvalue1 is incremented to cause the Cvalue1=2.

In operation 5414, the UE1 determines whether the Cvalue1 is less than a threshold Thd1. In some embodiments, the threshold Thd1 can refer to a predetermined maximum number Rm of retransmissions, for example, the Rm may be be equal to 5. Since Cvalue1 is equal to 2 and Thd1 is equal to 5, Cvalue1 is less than the Thd1, the UE1 will turn back to performing the operation 54. The UE1 will repeat performing the operations 54, 5411, 5412, 5413 and 5414 unless transmission of the TB1 succeeds or the Cvalue1 is equal to or larger than the Thd1. For example, the UE1 may not repeat performing the operations 54 to 5414 if Cvalue1 is equal to 5.

In some embodiments, if the Cvalue1 is equal to or larger than the Thd1 in the operation 5414, the UE1 will stop transmission of the TB1 in the operation 55. When the UE1 stops the transmission of the stored TB1, the UE1 may flush the HARQ buffer to erase the stored TB1. In some embodiments, the UE1 may transmit during this step the information to the BS indicating that the transmission of the TB1 has stopped and the HARQ buffer was flushed.

In some embodiments, if the Cvalue1 is equal to or larger than the Thd1 in operation 5414, the UE1 may perform resource detection and selection for transmission of the stored TB1 in the operation 56. For example, referring back to FIG. 3, the UE1 may autonomously select the available resource 12 in resource pool 301 to transmit the stored TB1. In some embodiments, the UE1 may transmit during this step the information to the BS indicating that an available resource is selected for the TB1.

Figure 8A:
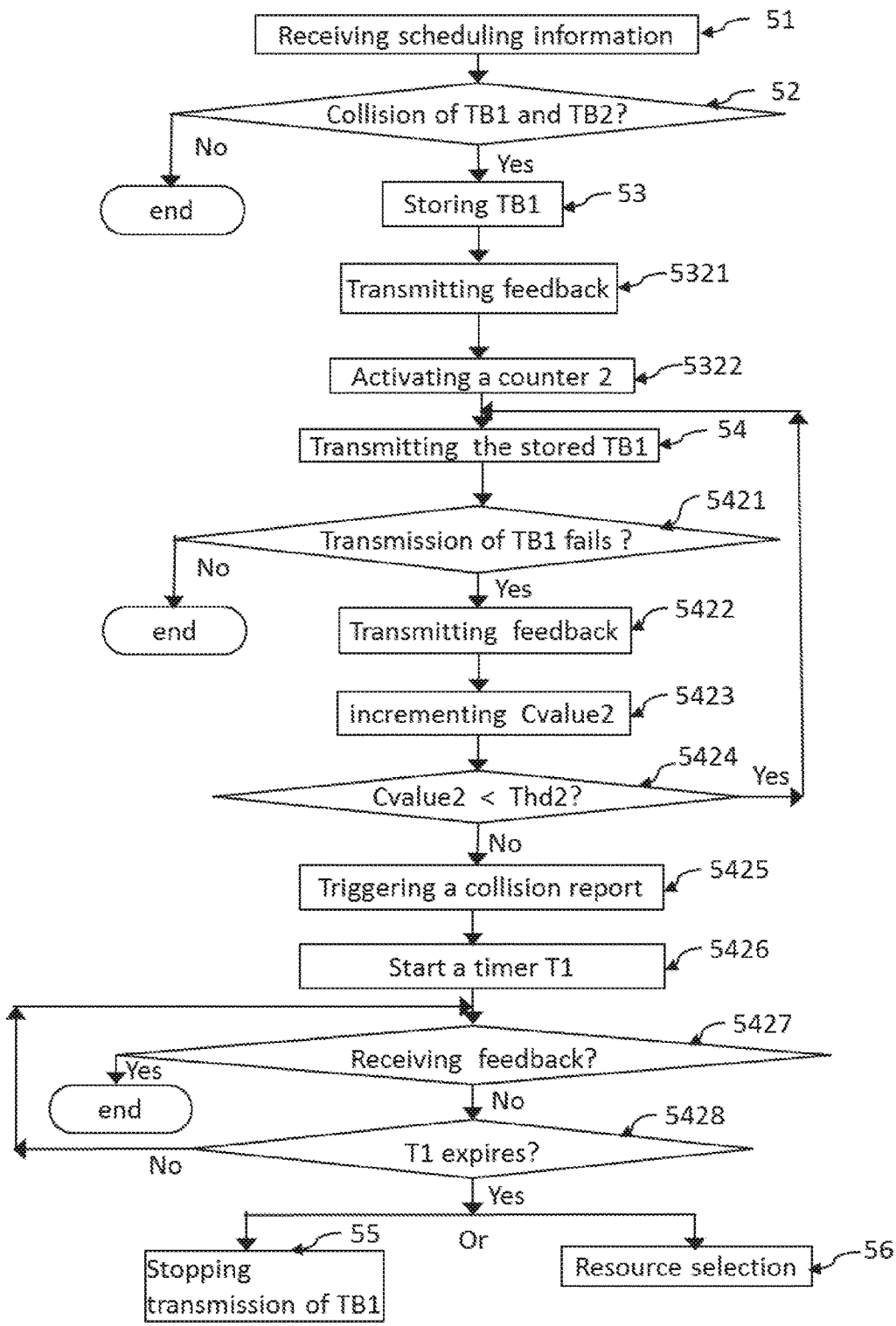
FIGS. 8A-8B illustrate other methods of handling collisions in accordance with some other embodiments of the subject application.

FIG. 8A illustrates another method of handling collision in accordance with some embodiments, for example, the collision as discussed above with respect to FIG. 3 or FIG. 4C. The method as shown in FIG. 8A can avoid discarding data (e.g. the TB1 or the TB2) or data loss when collision happens during the sidelink communication as shown in FIG. 4C.

In operation 51, the UE1 receives scheduling information from the BS. In some embodiments, the scheduling information may indicate that the TB1 is transmitted via the resource 11 scheduled by the BS.

After receiving the scheduling information in operation 51, the UE1 may determine whether a collision will occur when transmitting the TB1 and other TBs (e.g., TB2) in operation 52. For example, the UE1 may initiate the transmission of the TB1 on the resource 11 after receiving the scheduling information. At the same time, since the UE1 also has selected to transmit the TB2 on the resource 11, a collision of the TB1 and the TB2 will occur and is detected by the UE1. Since UE can only support transmission of one TB on a single resource due to limitation of capability, the transmission of the TB1 may fail on the signal resource and the UE1 may store, for example, the TB1 in operation 53.

In operation 5321, the UE1 transmits a feedback to the BS. In some embodiments, the feedback may refer to a HARQ NACK feedback. After the collision of the TB1 and TB2 occurs in the operation 52, the UE1 itself will generate and transmit the HARQ NACK feedback to the BS. It is contemplated that the feedback not only refers to a HARQ NACK feedback, it may refer to any feedback for indicating a failure of transmission of a TB in any other form.

In some embodiments, the HARQ NACK feedback can be transmitted after the UE1 stores the TB1 in operation 53. In some embodiments, the HARQ NACK feedback can be transmitted before the UE1 stores the TB1 in operation 53. In some embodiments, the HARQ NACK feedback can be transmitted when the UE1 stores the TB1 in operation 53.

In some embodiments, the UE1 may reuse the configured resource to transmit the HARQ NACK feedback to the BS. The BS may know that the transmission of the TB1 fails in the UE1 after receiving the HARQ NACK feedback from the UE1. The BS may schedule resource for transmission of the stored TB1. For example, the resource may refer to a bandwidth of Bw1 in a time window of Twin2 as illustrated in FIG. 4C.

In operation 5322, the UE1 activates or starts a counter 2. The counter 2 is used for counting the number of the HARQ NACK feedback transmissions. Once the counter 2 is activated or started, an original constant will be assigned to a counter value Cvalue2 of the counter 2. In some embodiments, the original constant can be assigned as one, that is, the initial or original value of the Cvalue2 may be equal to 1.

In operation 54, the UE1 transmits the stored TB1. In some embodiments, as shown in FIG. 4C, the UE1 may use the resource with a bandwidth of Bw1 in a time window of Twin2 scheduled by the BS to transmit the stored TB1. In some embodiments, the UE1 may autonomously select a transmission resource to transmit the stored TB1. Another collision may happen or occur when transmitting the stored TB1.

In operation 5421, if the transmission of the TB1 fails, the UE1 transmits a HARQ NACK feedback to the BS in operation 5422. In some embodiments, the HARQ NACK feedback may be caused only by a resource collision as similar shown in FIGS. 3 and 4C.

Alternatively, in the operation 5421, if the transmission of the TB1 succeeds, the UE1 may receive a HARQ ACK feedback from the UE2, and will transmit or send the HARQ ACK feedback to the BS for indication of a successful transmission of the stored TB1. It is contemplated that the UE1 may transmit a feedback indicating a successful transmission of the stored TB1 in any other form.

In operation 5423, the UE1 increments the Cvalue2 according to the HARQ NACK feedback caused only by resource collisions. The counter 2 is used for counting the number of the HARQ NACK feedbacks caused only by resource collisions. For example, Cvalue2 is incremented with a constant value of 1, that is, Cvalue2 is equal to 2 after adding the constant value of 1 to the original value of 1. For example, after transmission fails in the operation 5421, the Cvalue2 is incremented to cause the Cvalue2=2.

In operation 5424, the UE1 determines whether the Cvalue2 is less than a threshold Thd2. In some embodiments, the UE1 determines whether the Cvalue2 within a duration of time Tw2 is less than the Thd2. In some embodiments, the duration of time Tw2 may be configured by the BS or pre-configured in the UE1. In some embodiments, the threshold Thd2 is a predetermined value which is predetermined by the BS or pre-configured in the UE1. For example, the Thd2 may be predetermined or configured to be equal to 6. Since Cvalue2 is equal to 2 and the Thd2 is equal to 5, Cvalue2 is less than the Thd1, the UE1 will return to operation 54 and will repeat performing the operations 54, 54211, 5422, 5423 and 5424 unless transmission of the TB1 succeeds or the Cvalue2 is equal to or larger than the Thd2. For example, the UE1 may not repeat performing the operations 54, 54211, 5422, 5423 and 5424 if Cvalue2 is equal to 6.

In operation 5424, if the Cvalue2 is equal to or larger than the Thd2, the UE1 will trigger a collision report to the BS in operation 5425.

In some embodiments, the collision report may include a resource collision indicator. The resource collision indicator refers to information indicating that the scheduled or configured resource for transmission of the stored TB may not be available due to a resource collision as similarly shown in FIGS. 3 and 4C. In some embodiments, the collision report may include a new schedule request. When the BS receives a new schedule request from the UE1, the BS may schedule a new resource for transmission of TBs (e.g. the stored TB1). In some embodiments, the collision report may include both the resource collision indicator and the new schedule request. When the BS receives the resource collision report, the BS may reschedule a resource for transmission of the stored TB1.

In some embodiments, once a collision report is triggered, the latest HARQ NACK feedback which triggers the collision report will still increment the Cvalue2, that is, the counter 2 will still count for the latest HARQ NACK feedback. In some embodiments, once a collision report is triggered, the latest HARQ NACK feedback which triggers the collision report will not increment the Cvalue2 or will be replaced by the collision report, that is, the counter 2 will not stop counting for the latest HARQ NACK feedback. It is contemplated that the performing order of the above operations is not limited in the above figures, and may be altered in some embodiments.

In some embodiments, referring back to FIG. 7 and FIG. 8A, the counter 1 and the counter 2 may function or work in parallel. Since the counter 1 is used for counting the number of all HARQ NACK feedbacks and the counter 2 is used for counting the number of HARQ NACK feedbacks only caused by resource collisions, the counter 1 and the counter 2 may be running in parallel when the Cvalue1 is less than the Thd1 and the Cvalue2 is less than the Thd2. In some embodiments, once a collision report is triggered, the latest HARQ NACK feedback which triggers the collision report will still increment the Cvalue1 and the Cvalue2, that is, the counter 1 and counter 2 running in parallel will still count. In some embodiments, once a collision report is triggered, the latest HARQ NACK feedback which triggers the collision report will neither increment the Cvalue1 nor Cvalue2, the latest HARQ NACK feedback will be replaced by the collision report, that is, the counter 1 and the counter 2 running in parallel will not count.

In operation 5426, the UE1 starts a timer T1. The timer T1 is used for timing the collision report triggered or transmitted to the BS. It is contemplated that the timer T1 may be activated or started after the UE1 triggers a collision report to be transmitted to the BS in operation 5425. It is contemplated that the timer T1 may be activated or started when the UE1 triggers a collision report to the BS in the operation 5425.

In some embodiments, when the timer T1 is started or activated, the UE1 will not transmit a HARQ feedback to the BS unless the timer T1 stops timing. That is, the UE1 will not transmit a HARQ feedback to the BS when the timer T1 is running or timing.

In operation 5427, if the UE1 receives a feedback from the BS associated with the collision report. In some embodiments, the feedback from the BS associated with the collision report may include a new schedule grant. The new schedule grant may refer to a grant of a rescheduled resource for the UE1 to transmit the stored TB1. When the UE1 receives the new schedule grant, the UE1 may transmit the granted or rescheduled resource to transmit the stored TB1. In some embodiments, the feedback from the BS may include a resource pool re-configuration. The UE1 may be allowed to transmit the stored TB1 via a resource reconfigured in the resource pool re-configuration. In some embodiments, if the UE1 receives the feedback from the BS in the operation 5427, the UE1 may stop the timer T1.

In the operation 5427, if the UE1 fails to receive the feedback from the BS, the UE1 may turn to perform operation 5428.

In the operation 5428, if the timer T1 did not expire, the UE1 may turn back to performing the operation 5427 and continue monitoring and detecting whether the feedback from the BS is received by the UE1.

In the operation 5428, if the timer T1 expires, the UE1 may stop the transmission of the stored TB1 in the operation 55. When the UE1 stops the transmission of the stored TB1, the UE1 may flush the HARQ buffer to erase the stored TB1. In some embodiments, the UE1 may transmit during this step the information to the BS indicating that the transmission of the TB1 has stopped and the HARQ buffer was flushed.

In some embodiment, in the operation 5428, if the timer T1 expires, the UE1 may perform resource detection and selection for transmission of the stored TB1. For example, referring back to FIG. 3, the UE1 may autonomously select the available resource 12 in resource pool 301 to transmit the stored TB1. In some embodiments, the UE1 may transmit during this step the information to the BS indicating that an available resource is selected for the stored TB1.

Figure 8B:
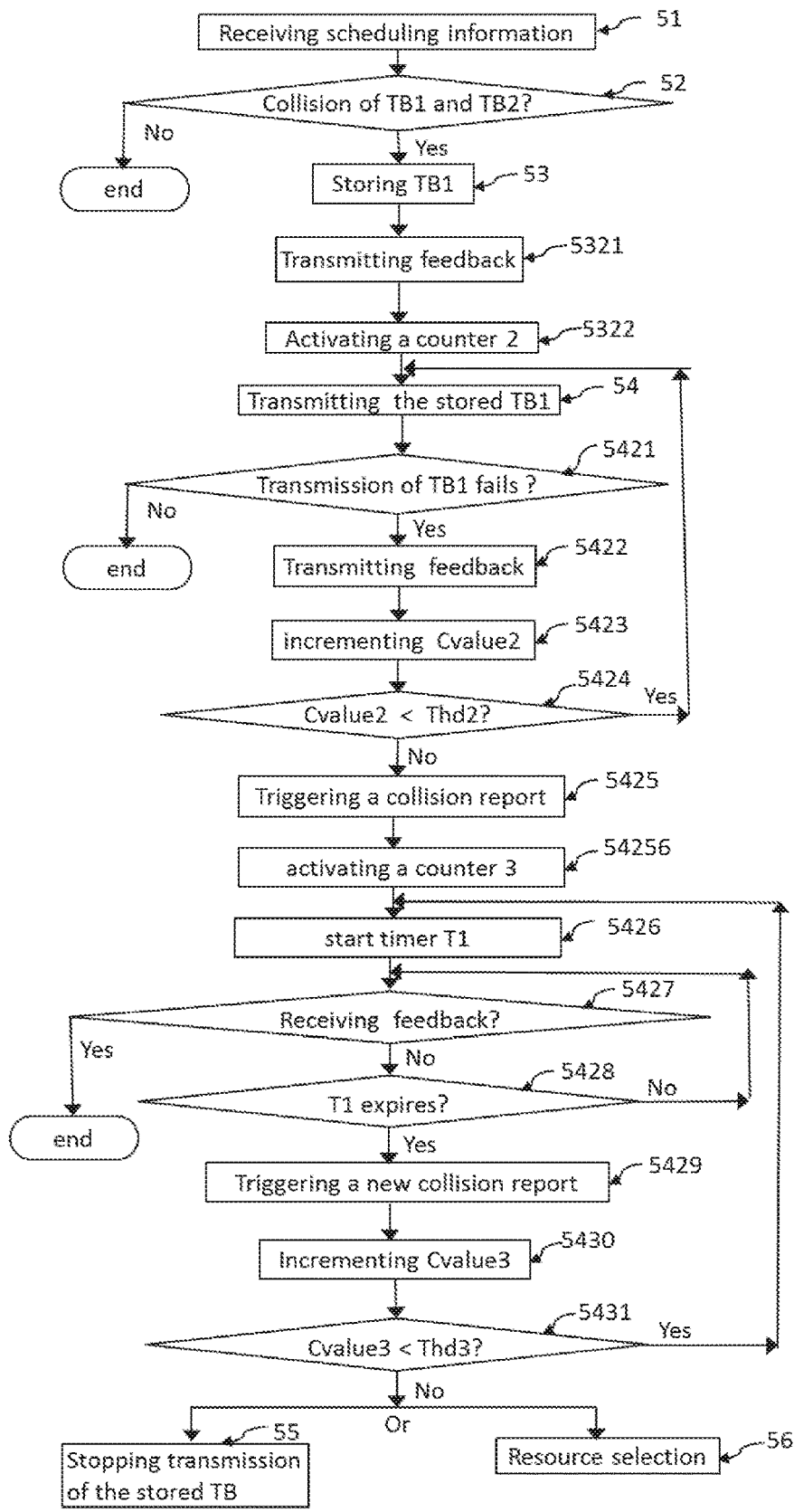

FIG. 8B illustrates another method of handling collision in accordance with some embodiments, for example, the collision as discussed above with respect to FIG. 3 or FIG. 4C. The method as shown in FIG. 8B can avoid discarding data (e.g. the TB1 or the TB2) or data loss when collision happens during the sidelink communication as shown in FIG. 4C.

Compared with FIG. 8A, FIG. 8B further includes operations 54256, 5429 and 5431.

Referring to FIG. 8B, the operation 54256 is subsequent to the operation 5425. In the operation 54256, the UE1 activates or starts a counter 3. The counter 3 may be used for counting the number of the collision reports transmitted to the BS. In some embodiments, after the UE1 triggers a collision report, the UE1 activates or starts a counter 3 and assigns an initial constant of 1 to the counter value Cvalue3 of the counter 3. In some embodiments, the initial constant is not limited to 1.

If the timer T1 expires in operation 5428, the UE1 triggers a new collision report to the BS in operation 5429.

Subsequently, in operation 5430, the UE1 increments the counter value Cvalue3 of the counter 3. The Cvalue3 represents or indicates the number of the collision report transmitted to the BS. In other words, the UE1 increases the Cvalue3 with an increment. For example, the Cvalue3 will be incremented with a constant of 1, that is, Cvalue3 is equal to 2. In other words, the UE1 increases the Cvalue3 with an increment of 1. For example, after T1 expires in the operation 5428, the Cvalue3 is incremented to cause the Cvalue3=2.

In operation 5431, the UE1 determines whether the Cvalue3 is less than a threshold Thd3. In some embodiments, the UE1 determines whether the Cvalue3 is less than a Thd3 within a duration of time Tw3. In some embodiments, the duration of time Tw3 may be configured by the BS or preconfigured in the UE1. In some embodiments, the threshold Thd3 is configured by the BS or pre-configured in the UE1, for example, the Thd3 may be predetermined to be equal to 5. Since Cvalue3 is equal to 2 and Thd3 is equal to 5, Cvalue3 is less than the Thd3, the UE1 will turn back to performing the operation 5426. For example, the UE1 will restart the timer T1 and perform timing. The UE1 will repeat performing the operations 5426 to 5431 until the Cvalue3 is equal to or larger than the Thd3 or receiving the feedback from the BS. For example, the UE1 may not repeat performing the operations 5426 to 5431 until Cvalue3 is equal to 5.

In some embodiments, if the Cvalue3 is equal to or larger than the Thd3 in the operation 5431, the UE1 will stop transmission of the TB1 in the operation 55. When the UE1 stops the transmission of the stored TB1, the UE1 may flush the HARQ buffer to erase the stored TB1. In some embodiments, the UE1 may transmit during this step the information to the BS indicating that the transmission of the TB1 has stopped and the HARQ buffer was flushed.

In some embodiments, if the Cvalue3 is equal to or larger than the Thd3 in operation 5431, the UE1 may perform resource detection and selection for transmission of the stored TB1 in the operation 56. For example, referring back to FIG. 3, the UE1 may autonomously select the available resource 12 in resource pool 301 to transmit the stored TB1. In some embodiments, the UE1 may transmit during this step the information to the BS indicating that an available resource is selected for the TB1.

In some embodiments, if the UE1 receives feedback from the BS associated with the collision report after T1 expires, the UE1 may be in response to the feedback and transmit the stored TB1. In some embodiments, if the UE1 receives feedback from the BS associated with the collision report after T1 expires, the UE1 may be not in response to the feedback and will not transmit the store TB1 according to the feedback.

Figure 9A:
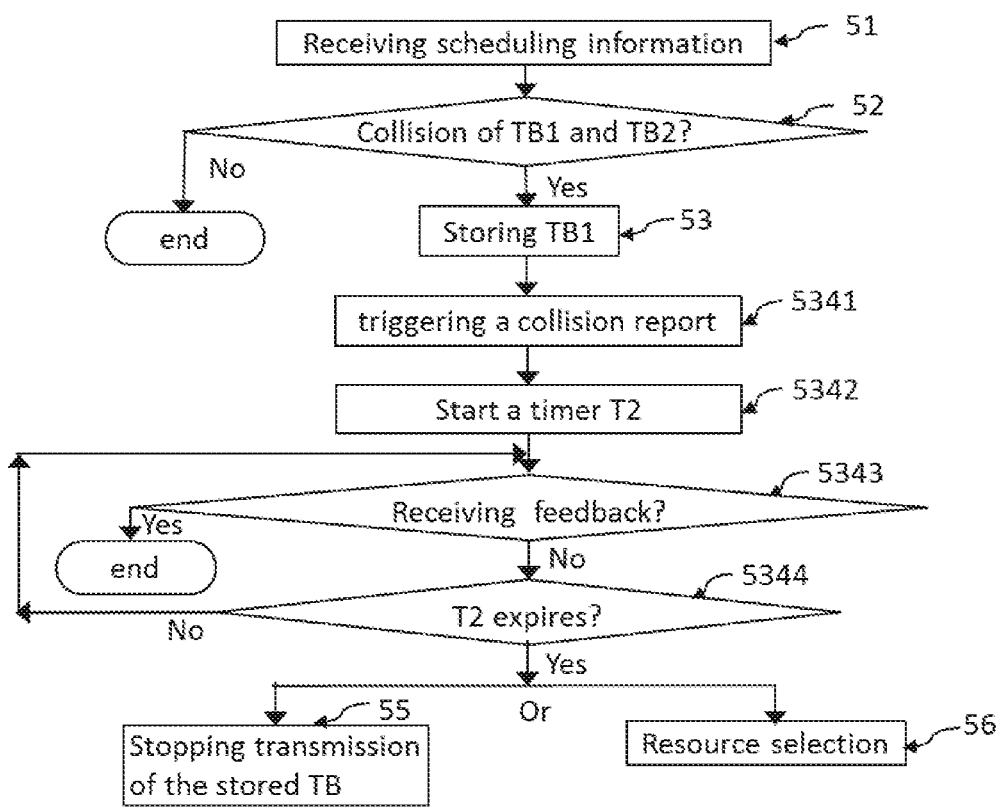
FIGS. 9A-9B illustrate other methods of handling collisions in accordance with some other embodiments of the subject application.

FIG. 9A illustrates another method of handling collision in accordance with some embodiments, for example, the collision as discussed above with respect to FIG. 3 or FIG. 4C. The method as shown in FIG. 9A can avoid discarding data (e.g. the TB1 or the TB2) or data loss when collision happens during the sidelink communication as shown in FIG. 4C.

In operation 51, the UE1 receives scheduling information from the BS. In some embodiments, the scheduling information may indicate that the TB1 is transmitted via the resource 11 scheduled by the BS.

After receiving the scheduling information in operation 51, the UE1 may determine whether a collision will occur when transmitting the TB1 and other TBs (e.g., TB2) in operation 52. For example, the UE1 may initiate the transmission of the TB1 on the resource 11 after receiving the scheduling information. At the same time, since the UE1 also has selected to transmit the TB2 on the resource 11, a collision of the TB1 and the TB2 will occur and is detected by the UE1. Since UE can only support transmission of one TB on a single resource due to limitation of capability, the transmission of the TB1 may fail on this single resource and the UE1 may store the TB1 in operation 53.

In operation 5341, the UE1 transmits or triggers a collision report to the BS.

In some embodiments, the collision report may include a resource collision indicator. The resource collision indicator refers to information indicating that the scheduled or configured resource for transmission of the stored TB may be not available due to a resource collision as similarly shown in FIGS. 3 and 4C. In some embodiments, the collision report may include a new schedule request. When a BS receives a new schedule request from the UE1, the BS may reschedule a resource for transmission of TBs (e.g. the stored TB1). In some embodiments, the collision report may include both the resource collision indicator and the new schedule request. When the BS receives the resource collision report, the BS may reschedule a resource for transmission of the stored TB1.

In operation 5342, the UE1 starts a timer T2. The timer T2 is used for timing the collision report triggered or transmitted to the BS. It is contemplated that the timer T2 may be activated or started after the UE1 triggers a collision report to the BS in operation 5341. It is contemplated that the timer T2 may be activated or started when the UE1 triggers a collision report to the BS in the operation 5341.

In operation 5343, if the UE1 receives a feedback from the BS associated with the collision report. In some embodiments, the feedback from the BS associated with the collision report may include a new schedule grant. The new schedule grant may refer to a grant of a rescheduled resource for the UE1 to transmit the stored TB1. When the UE1 receives the new schedule grant, the UE1 may transmit the granted or rescheduled resource to transmit the stored TB1. In some embodiments, the feedback from the BS may include a resource pool re-configuration. The UE1 may be allowed to transmit the stored TB1 via a resource reconfigured in the resource pool re-configuration. In some embodiments, if the UE1 receives the feedback from the BS in the operation 5343, the UE1 may stop the timer T2.

In the operation 5343, if the UE1 fails to receive the feedback from the BS, the UE1 may turn to perform the operation 5344.

In the operation 5344, if the timer T2 does not expire, the UE1 may turn back to performing the operation 5343 and continue monitoring and detecting whether the feedback from the BS is received by the UE1.

In the operation 5344, if the timer T2 expires, the UE1 may stop the transmission of the stored TB1 in the operation 55. When the UE1 stops the transmission of the stored TB1, the UE1 may flush the HARQ buffer to erase the stored TB1. In some embodiments, the UE1 may transmit during this step the information to the BS indicating that the transmission of the TB1 has stopped and the HARQ buffer was flushed.

In some embodiment, in the operation 5344, if the timer T2 expires, the UE1 may perform resource detection and selection for transmission of the stored TB1. For example, referring back to FIG. 3, the UE1 may autonomously select the available resource 12 in resource pool 301 to transmit the stored TB1. In some embodiments, the UE1 may transmit during this step the information to the BS indicating that an available resource is selected for the stored TB1.

Figure 9B:
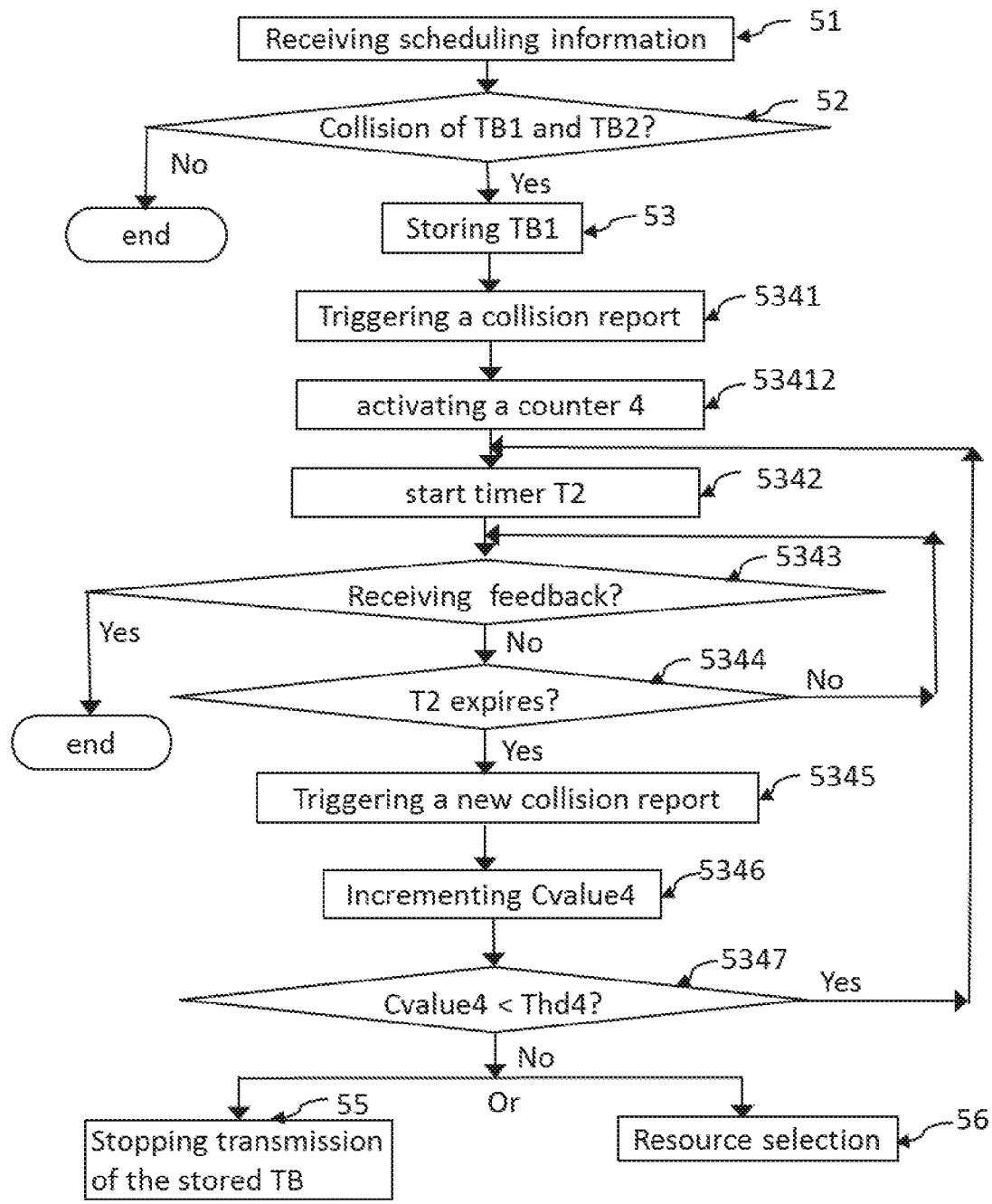

FIG. 9B illustrates another method of handling collision in accordance with some embodiments, for example, the collision as discussed above with respect to FIG. 3 or FIG. 4C. The method as shown in FIG. 9B can avoid discarding data (e.g. the TB1 or the TB2) or data loss when collision happens during the sidelink communication as shown in FIG. 4C.

Compared with FIG. 9A, FIG. 9B further includes an operation 53412, an operation 5345, an operation 5346 and an operation 5347.

Referring to FIG. 9B, the operation 53412 is subsequent to the operation 5341. In the operation 53412, the UE1 activates or starts a counter 4. The counter 4 may be used for counting the number of the collision reports transmitted to the BS. In some embodiments, after the UE1 triggers a collision report, the UE1 activates or starts a counter 4 and assigns an initial constant of 1 to the counter value Cvalue4 of the counter 4. In some embodiments, the initial constant is not limited to 1.

If the timer T2 expires in operation 5344, the UE1 triggers a new collision report to the BS in operation 5345.

Subsequently, in operation 5346, the UE1 increments the counter value Cvalue4 of the counter 4. The Cvalue4 represents or indicates the number of the collision reports transmitted to the BS. In other words, the UE1 increases the Cvalue4 with an increment. For example, the Cvalue4 will be incremented with a constant of 1, that is, Cvalue4 is equal to 2 by adding the constant of 1 and the initial value of 1. In other words, the UE1 increases the Cvalue4 with an increment of 1. For example, after T2 expires in the operation 5344, the Cvalue4 is incremented to cause the Cvalue4=2.

In operation 5347, the UE1 determines whether the Cvalue4 is less than a threshold Thd4. In some embodiments, the UE1 determines whether the Cvalue4 is less than the Thd4 within a duration of time Tw4. In some embodiments, the duration of time Tw4 may be configured by the BS or preconfigured in the UE1. In some embodiments, the threshold Thd4 is configured by the BS or pre-configured in the UE1, for example, the Thd4 may be predetermined to be equal to 5. Since Cvalue4 is equal to 2 and Thd4 is equal to 5, Cvalue4 is less than the Thd4, the UE1 will turn back to performing the operation 5342. For example, the UE1 will restart the timer T2 and perform timing. The UE1 will repeat performing the operations 5342 to 5347 until the Cvalue4 is equal to or larger than the Thd4 or receiving the feedback from the BS. For example, the UE1 may not repeat performing the operations 5342 to 5347 until Cvalue4 is equal to 5.

In some embodiments, if the Cvalue4 is equal to or larger than the Thd4 in the operation 5347, the UE1 will stop transmission of the TB1 in the operation 55. When the UE1 stops the transmission of the stored TB1, the UE1 may flush the HARQ buffer to erase the stored TB1. In some embodiments, the UE1 may transmit during this step the information to the BS indicating that the transmission of the TB1 has stopped and the HARQ buffer was flushed.

In some embodiments, if the Cvalue4 is equal to or larger than the Thd4 in operation 5347, the UE1 may perform resource detection and selection for transmission of the stored TB1 in the operation 56. For example, referring back to FIG. 3, the UE1 may autonomously select the available resource 12 in resource pool 301 to transmit the stored TB1. In some embodiments, the UE1 may transmit during this step the information to the BS indicating that an available resource is selected for the TB1.

Figure 10A:
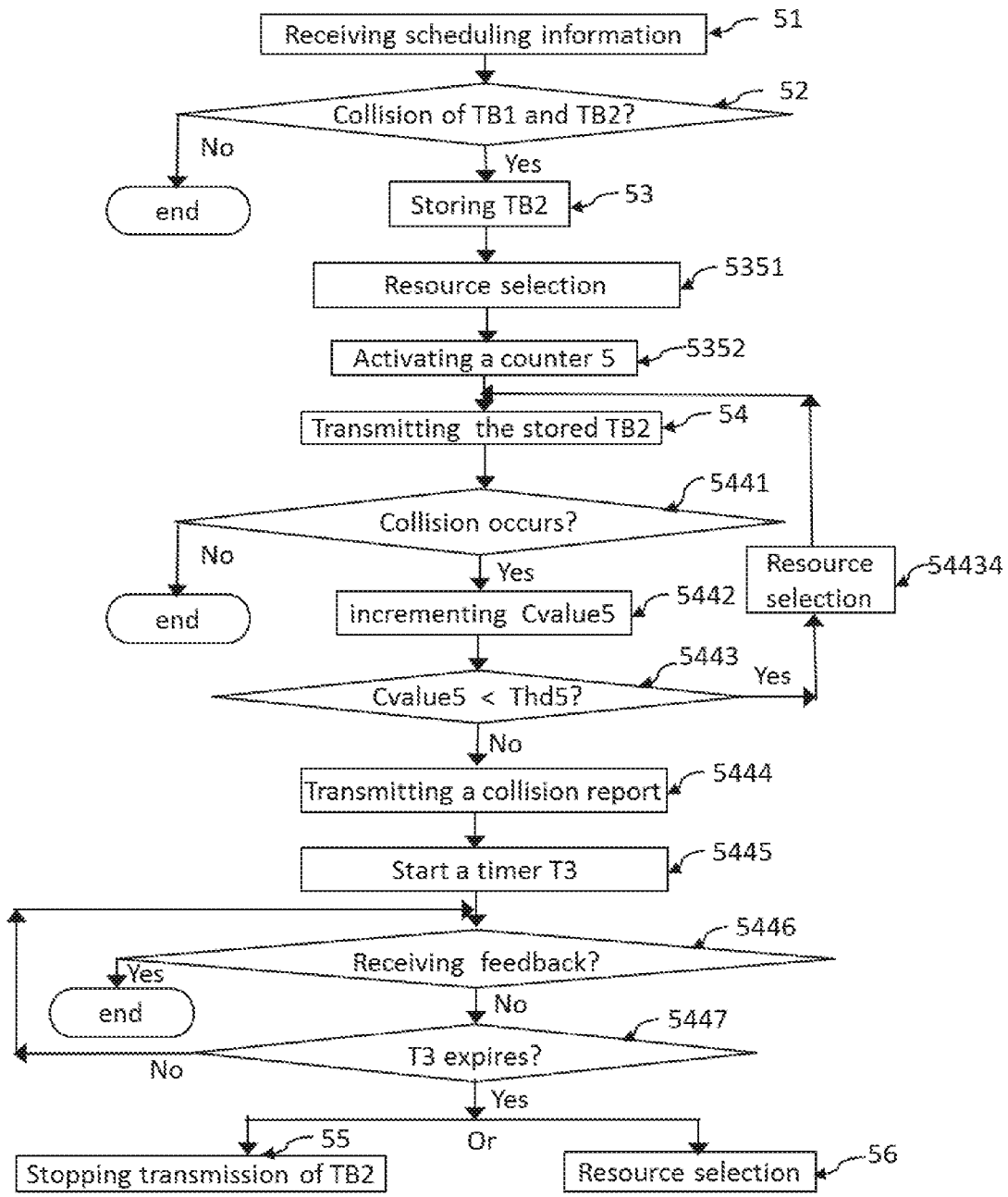
FIGS. 10A-10B illustrate other methods of handling collisions in accordance with some other embodiments of the subject application.

FIG. 10A illustrates another method of handling collision in accordance with some embodiments, for example, the collision as discussed above with respect to FIG. 3 or FIG. 4C. The method as shown in FIG. 10A can avoid discarding data (e.g. the TB1 or the TB2) or data loss when collision happens during the sidelink communication as shown in FIG. 4C.

In operation 51, the UE1 receives scheduling information from the BS. In some embodiments, the scheduling information may indicate that the TB1 is transmitted via the resource 11 scheduled by the BS.

After receiving the scheduling information in operation 51, the UE1 may determine whether a collision will occur when transmitting the TB1 and other TBs (e.g., TB2) in operation 52. For example, the UE1 may initiate the transmission of the TB1 on the resource 11 after receiving the scheduling information. At the same time, since the UE1 also has selected to transmit the TB2 on the resource 11, a collision of the TB1 and the TB2 will occur and is detected by the UE1. Since UE can only support transmission of one TB on a single resource due to limitation of capability, the transmission of the TB2 may fail on this single resource and the UE1 may store the TB2 in operation 53.

In operation 5351, the UE1 performs resource detection and selection for the transmission of the stored TB2. In some embodiments, the UE1 may autonomously select an available resource (e.g., resource 12 in resource pool 301) for the transmission of the stored TB2. However, when transmitting the stored TB2, collisions may probably occur as similarly shown in FIG. 2.

In operation 5352, the UE1 starts or activates a counter 5. The counter 5 is used for counting the number of resource collisions during the transmission of the stored TB2. Once the counter 5 is activated or started, an original constant will be assigned to a counter value Cvalue5 of the counter 5. In some embodiments, the original constant can be assigned as zero, that is, the initial or original value of the Cvalue5 may be equal to 0.

In operation 54, the UE1 transmits the stored TB2. In some embodiments, as shown in FIG. 4C, the UE1 may use the resource with a bandwidth of Bw1 in a time window of Twin2 scheduled by the BS to transmit the stored TB2. In some embodiments, the UE1 may autonomously select a transmission resource (e.g., resource 12 in resource pool 301) to transmit the stored TB2. Collisions may happen or occur when transmitting the stored TB2.

In operation 5441, the UE1 determines whether a collision occurs when transmitting the stored TB2.

In some embodiments, if a collision does not occur when transmitting the stored TB2 in the operation 5441, the stored TB2 may be successfully transmitted.

In some embodiments, if a collision occurs when transmitting the stored TB2 in operation 5441, the UE1 turns to perform the operation 5442.

In operation 5442, the UE1 increments the Cvalue5. The Cvalue5 represents or indicates the number of the resource collisions occurring during transmission of the stored TB2. For example, the Cvalue5 is incremented with a constant value of 1, that is, Cvalue5 is equal to 1 after adding the constant value of 1 to the original value of 0. For example, after a collision occurs in the operation 5441, the Cvalue5 is incremented to cause the Cvalue5=1. After incrementing the Cvalue5, the UE1 turns to perform operation 5443.

In the operation 5443, the UE1 determines whether the Cvalue5 is less than a threshold Thd5. In some embodiments, the UE1 determines whether the Cvalue5 within a duration of time Tw5 is less than a Thd5. In some embodiments, the duration of time Tw5 may be configured by the BS or preconfigured in the UE1. In some embodiments, the threshold Thd5 is a predetermined value which is predetermined by the BS or pre-configured in the UE1. For example, the Thd5 may be predetermined or configured to be equal to 6. Since Cvalue5 is equal to 1 and the Thd5 is equal to 5, Cvalue5 is less than the Thd5, the UE1 will turn to performing the operation 54434. Subsequently, the UE1 may again perform the operation 54 to transmit the stored TB2. The UE1 will repeat performing the operations 54, 5441, 5442, 5443 and 54434 unless no collision occurs or the Cvalue5 is equal to or larger than the Thd5. For example, the UE1 may not repeat performing the operations 54, 5441, 5442, 5443 and 54434 until Cvalue5 is equal to 6.

In the operation 5443, the UE1 will turn to perform operation 5444 if the Cvalue5 is equal to or larger than the Thd5.

In the operation 5444, the UE1 transmit a collision report to the BS.

In some embodiments, the collision report may include a resource collision indicator. The resource collision indicator refers to information indicating that the scheduled or configured resource for transmission of the stored TB2 may be not available due to a resource collision as similarly shown in FIGS. 3 and 4C. In some embodiments, the collision report may include a new schedule request. When the BS receives a new schedule request from the UE1, the BS may reschedule a resource for transmission of TBs (e.g. the stored TB2). In some embodiments, the collision report may include both the resource collision indicator and the new schedule request. When the BS receives the resource collision report, the BS may reschedule a resource for transmission of the stored TB2.

In operation 5445, the UE1 starts a timer T3. The timer T3 is used for timing the collision report triggered or transmitted to the BS. It is contemplated that the timer T3 may be activated or started after the UE1 triggers a collision report to the BS in the operation 5444. It is contemplated that the timer T3 may be activated or started when the UE1 triggers a collision report to the BS in the operation 5444.

In operation 5446, if the UE1 receives a feedback from the BS associated with the collision report. In some embodiments, the feedback from the BS associated with the collision report may include a new schedule grant. The new schedule grant may refer to a grant of a rescheduled resource for the UE1 to transmit the stored TB2. When the UE1 receives the new schedule grant, the UE1 may transmit the granted or rescheduled resource to transmit the stored TB2. In some embodiments, the feedback from the BS may include a resource pool re-configuration. The UE1 may be allowed to transmit the stored TB2 via a resource reconfigured in the resource pool re-configuration. In some embodiments, if the UE1 receives the feedback from the BS in the operation 5446, the UE1 may stop the timer T3.

In the operation 5446, if the UE1 fails to receive the feedback from the BS, the UE1 may turn to perform the operation 5447.

In the operation 5447, if the timer T3 does not expire, the UE1 may turn back to performing the operation 5446 and continue monitoring and detecting whether the feedback from the BS is received by the UE1.

In the operation 5447, if the timer T3 expires, the UE1 may stop the transmission of the stored TB2 in the operation 55. When the UE1 stops the transmission of the stored TB2, the UE1 may flush the HARQ buffer to erase the stored TB2. In some embodiments, the UE1 may transmit during this step the information to the BS indicating that the transmission of the TB2 has stopped and the HARQ buffer was flushed.

In some embodiment, in the operation 5447, if the timer T3 expires, the UE1 may perform or restart resource detection and selection for transmission of the stored TB2. For example, referring back to FIG. 3, the UE1 may autonomously select the available resource 12 in resource pool 301 to transmit the stored TB2. In some embodiments, the UE1 may transmit during this step the information to the BS indicating that an available resource is selected for the stored TB2.

Figure 10B:
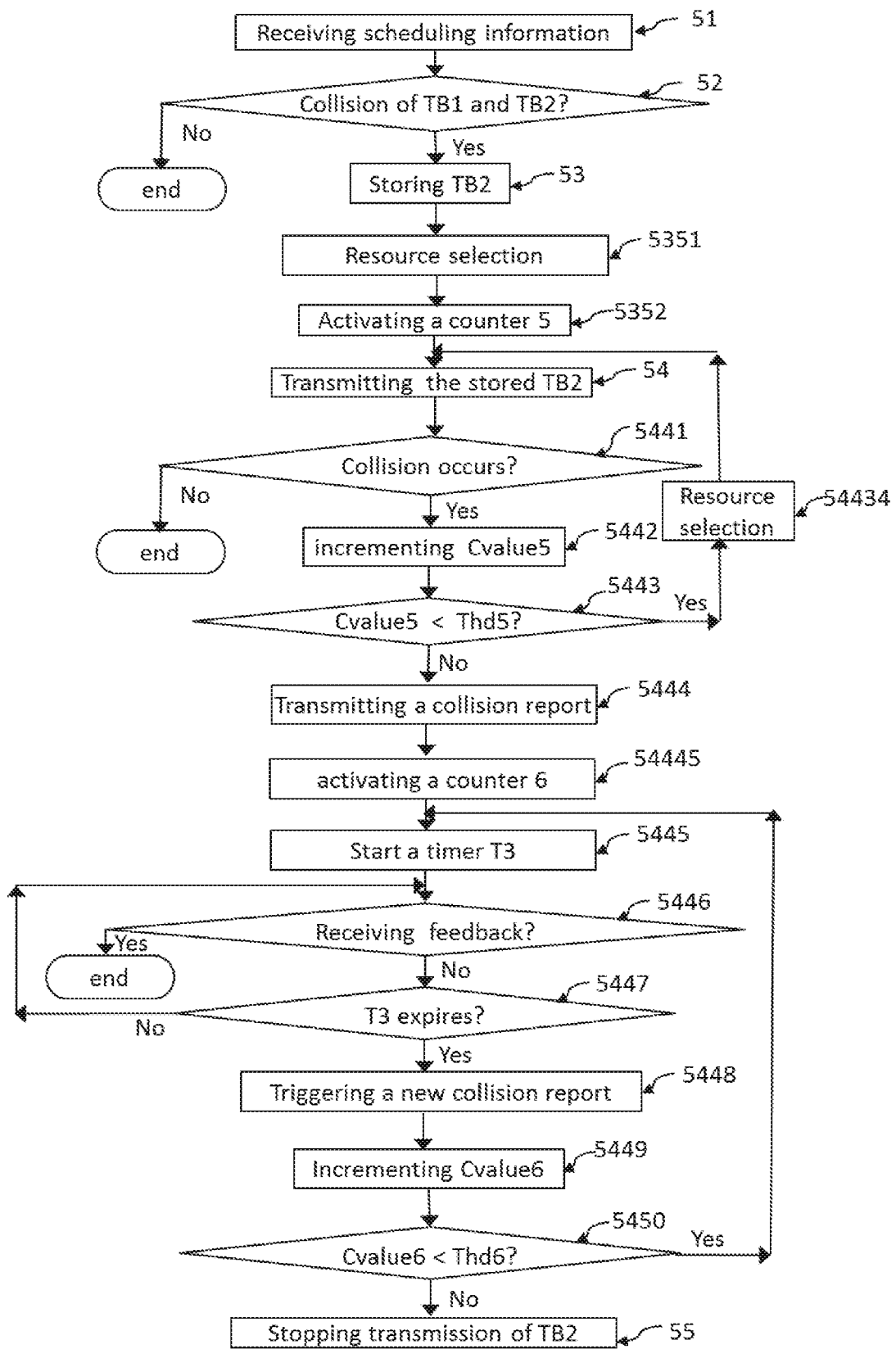

FIG. 10B illustrates another method of handling collision in accordance with some embodiments, for example, the collision as discussed above with respect to FIG. 3 or FIG. 4C. The method as shown in FIG. 10B can avoid discarding data (e.g. the TB1 or the TB2) or data loss when collision happens during the sidelink communication as shown in FIG. 4C.

Compared with FIG. 10A, FIG. 10B further includes an operation 54445, an operation 5448, an operation 5449 and an operation 5450.

Referring to FIG. 9B, the operation 54445 is subsequent to the operation 54445. In the operation 54445, the UE1 activates or starts a counter 6. The counter 6 may be used for counting the number of the collision reports transmitted to the BS. In some embodiments, after the UE1 triggers a collision report, the UE1 activates or starts a counter 6 and assigns an initial constant of 1 to the counter value Cvalue6 of the counter 6. In some embodiments, the initial constant is not limited to 1.

If the timer T3 expires in operation 5447, the UE1 triggers a new collision report to the BS in operation 5448.

Subsequently, in operation 5449, the UE1 increments the counter value Cvalue6 of the counter 6. In other words, the UE1 increases the Cvalue6 with an increment. For example, the Cvalue6 will be incremented with a constant of 1, that is, Cvalue6 is equal to 2 by adding the constant of 1 to the original value of 1. In other words, the UE1 increases the Cvalue6 with an increment of 1. For example, after T3 expires in the operation 5447, the Cvalue6 is incremented to cause the Cvalue6=2.

In operation 5450, the UE1 determines whether the Cvalue6 is less than a threshold Thd6. In some embodiments, the UE1 determines whether the Cvalue6 is less than a Thd6 within a duration of time Tw6. In some embodiments, the duration of time Tw6 may be configured by the BS or preconfigured in the UE1. In some embodiments, the threshold Thd6 is configured by the BS or pre-configured in the UE1, for example, the Thd6 may be predetermined to be equal to 5. Since Cvalue6 is equal to 2 and Thd6 is equal to 5, Cvalue6 is less than the Thd6, the UE1 will turn back to performing the operation 5445. For example, the UE1 will restart the timer T3 and timing. The UE1 will repeat performing the operations 5445 to 5450 until the Cvalue6 is equal to or larger than the Thd6 or receiving the feedback from the BS. For example, the UE1 may not repeat performing the operations 5445 to 5450 until Cvalue6 is equal to 5.

In some embodiments, if the Cvalue6 is equal to or larger than the Thd6 in the operation 5450, the UE1 will stop transmission of the TB2 in the operation 55. When the UE1 stops the transmission of the stored TB2, the UE1 may flush the HARQ buffer to erase the stored TB2. In some embodiments, the UE1 may transmit during this step the information to the BS indicating that the transmission of the TB2 has stopped and the HARQ buffer was flushed. In some embodiments, the Thd1 to Thd5 and Tw1 to Tw6 may be configured by upper layers. In some embodiments, the upper layer may include a radio resource control (RRC) layer.

Figure 11A:
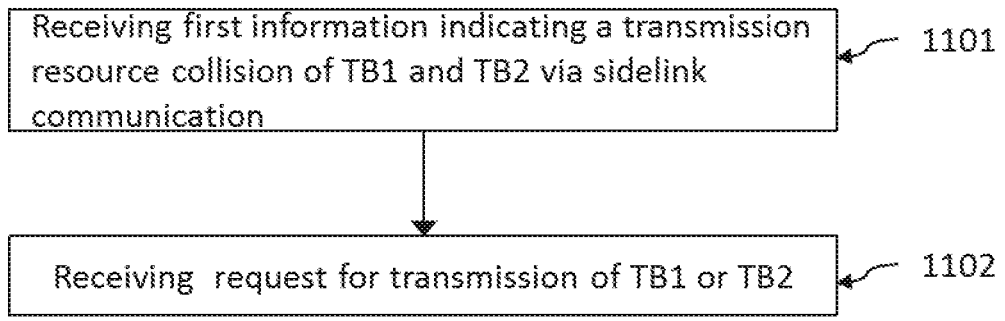
FIGS. 11A-11B illustrate other methods of handling collisions in accordance with some other embodiments of the subject application.
Figure 11B:
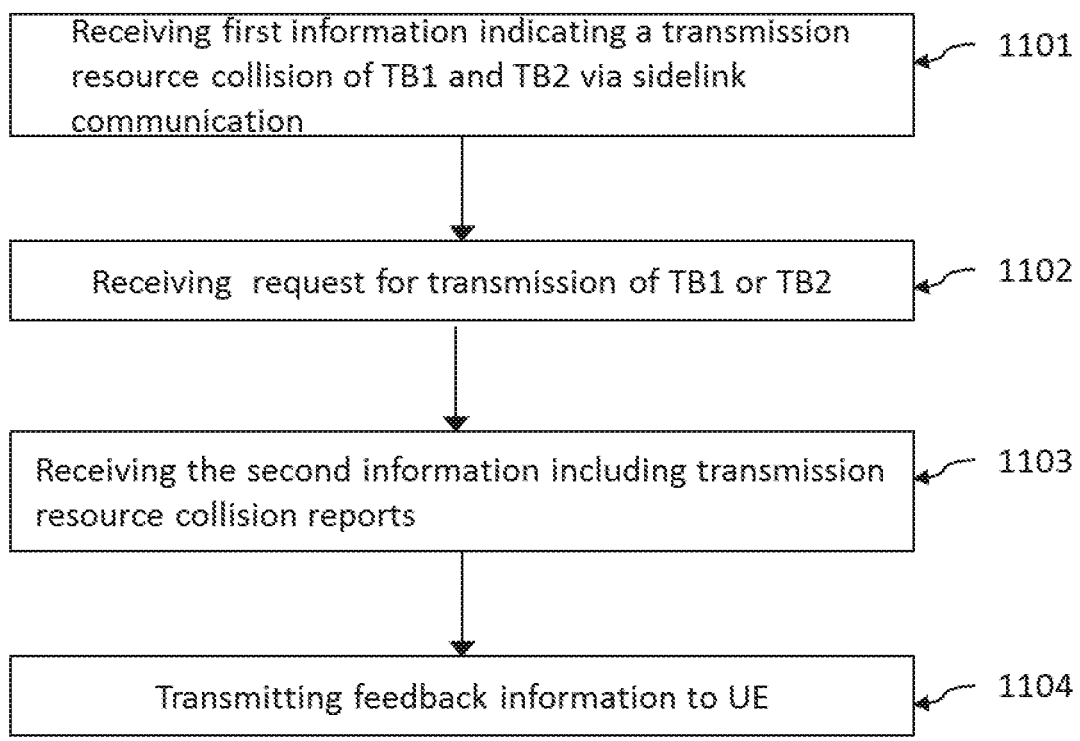

FIGS. 11A-11B illustrate other methods of handling collision in accordance with some embodiments, for example, the collision as discussed above with respect to FIG. 3 or FIG. 4C.

In operation 1101, BS receives first information indicating a transmission collision of TB1 and TB2 via sidelink communication. In some embodiments, the first information may include the HARQ feedback.

In operation 1102, BS receives request for transmission of TB1 or TB2. In some embodiments, BS receives request for transmission of TB1 if transmission of the TB1 fails due to a collision of the TB1 and TB2. In some embodiments, BS receives request for transmission of TB2 if transmission of the TB2 fails due to the collision of the TB1 and the TB2.

Referring back to FIG. 11B, in operation 1103, BS receives the second information including transmission resource collision reports from the UE1.

In operation 1104, BS transmits feedback information to the UE1. In some embodiments, the feedback information may include a new schedule grant. In some embodiments, the feedback information may include a transmission resource pool re-configuration. In some embodiments, the feedback information may include both a new schedule grant and a transmission resource pool re-configuration. The UE1 may retransmit TB or TB2 via rescheduled or re-configured resource which is available.

Figure 12:
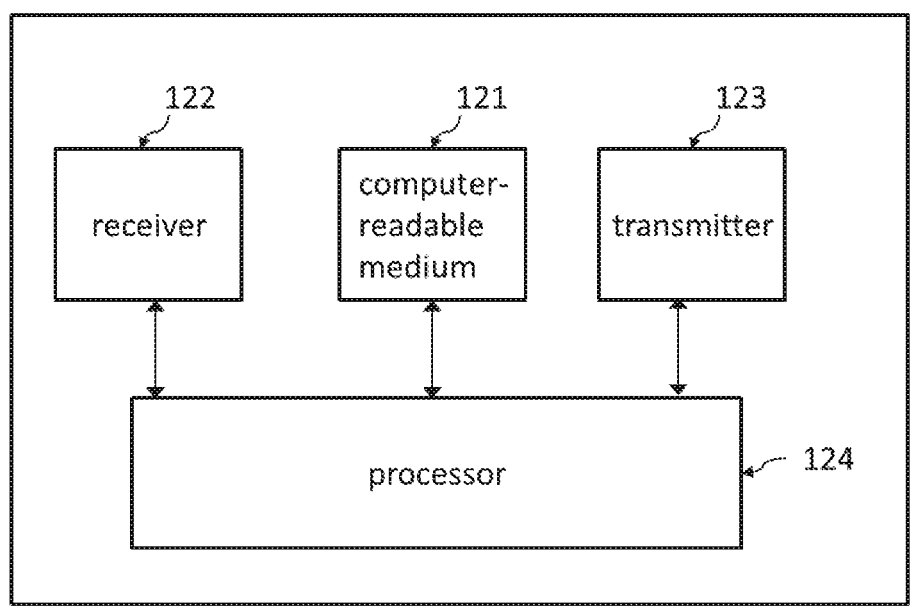
FIG. 12 illustrates an apparatus of handling collisions in accordance with some embodiments of the subject application.

FIG. 12 illustrates an apparatus of handling collisions in accordance with some embodiments of the subject application.

As shown in FIG. 12, the apparatus 120 may include a non-transitory computer-readable medium 121. The apparatus 120 may further include a receiver 122. The apparatus 120 may further include a transmitter 123. The apparatus 120 may further include a processer 124. The non-transitory computer-readable medium 121 has computer executable instructions stored therein. The processor 124 is configured to be coupled to the non-transitory computer readable medium 121. The processor 124 is configured to be coupled to the receiver 122. The processor 123 is configured to be coupled to the transmitter 123. It is contemplated that the apparatus 120 may include more computer-readable mediums, receiver, transmitter and processors in some other embodiments of the subject application according to practical requirements. In some embodiments, the apparatus 120 may be a UE. UE may include, for example but is not limited to, a computing device, a wearable device, a mobile device, an IoT device, a vehicle having at least a transceiver, etc. In some embodiments, the apparatus 120 may be a BS. BS may operate, for example but is not limited to, based on the standard protocol of LTE, LTE-A, NR, or other suitable protocol(s). In some embodiments, the receiver 122 and the transmitter 123 are integrated into a single device, such as a transceiver. In certain embodiments, the apparatus 120 may further include an input device, a memory, and/or other components.

In some embodiments, the non-transitory computer-readable medium may have stored thereon computer-executable instructions to cause a processor to implement the method with respect to the UE1 which be assumed to function as a transmitting UE as describe above. For example, the non-transitory computer-readable medium 121 and the computer executable instructions are configured, with the processor 124, cause the apparatus 120 to perform the operations with respect to the UE1 depicted in FIGS. 5-1B.

In some embodiments, the non-transitory computer-readable medium may have stored thereon computer-executable instructions to cause a processor to implement the method with respect to BS as describe above. For example, the non-transitory computer-readable medium 121 and the computer executable instructions are configured, with the processor 124, cause the apparatus 120 to perform the operations with respect to the BS depicted in FIGS. 11A-11B.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The following is what is claimed:

1. A method performed by a first communication equipment, the method comprising:
   receiving first scheduling information;
   determining whether there is a transmission resource collision of a first transport block (TB) and a second TB, wherein the transmission resource collision comprises the first scheduling information indicating to transmit the first TB and the second TB on the same resource at the same time;
   storing the first TB or the second TB for transmission if the transmission resource collision is determined, wherein:
   the first TB is different from the second TB;
   in response to the second TB having a higher priority than the first TB:
      the second TB is transmitted for a first time based on the first scheduling information;
      the first TB is stored and not transmitted based on the first scheduling information; and
      the first TB is transmitted for the first time after the second TB is transmitted for the first time using a first autonomously selected resource selected by the first communication equipment based on a set of resources available for use by the first communication equipment and based on resources concurrently being used by other communication equipment; and
   in response to the first TB having a higher priority than the second TB:
      the first TB is transmitted for the first time based on the first scheduling information;
      the second TB is stored and not transmitted based on the first scheduling information; and the second TB is transmitted for the first time after the first TB is transmitted for the first time using a second autonomously selected resource selected by the first communication equipment based on the set of resources available for use by the first communication equipment and based on the resources concurrently being used by the other communication equipment;

transmitting second information to a second communication equipment if the first TB is determined to be discarded, wherein the transmission resource collision occurs if the first transmission resource is the same as a second transmission resource;

transmitting, to the second communication equipment, the transmission resource collision report if a second counter value is equal to or greater than a predetermined value within a first duration, wherein the transmission resource collision report includes a resource collision indicator, a schedule request, or both;

starting a first timer when transmitting the transmission resource collision report; and stopping transmitting HARQ feedback if the first timer is running.

2. The method of claim 1, further comprising:
performing transmission resource detection and selection in a transmission resource pool if the second TB is determined to be discarded, wherein the transmission resource collision occurs if the first transmission resource is the same to the second transmission resource.

3. The method of claim 2, further comprising:
determining a count of transmission resource collisions; and
stopping retransmission of the second TB within a predetermined time window when the count of transmission resource collisions reaches a threshold within a duration.

4. The method of claim 3, further comprising:
transmitting, to a second communication equipment, second information when the count of transmission resource collisions reaches a third threshold within a third duration;
wherein the second information includes a transmission resource collision report.

5. The method of claim 1, wherein the second information comprises a hybrid automatic repeat request (HARQ) feedback, and wherein the method further comprises:
determining a first counter value according to a count of all HARQ negative-acknowledgement (NACK) feedback.

6. The method of claim 5, further comprising:
increasing the first counter value if the transmission fails and if the first counter value is less than a predetermined number of transmissions.

7. The method of claim 5, further comprising:
stopping transmission of the first TB if the first counter value is equal to or greater than a predetermined number of retransmissions; and
erasing the stored first TB if the first counter value is equal to or greater than a predetermined number of retransmissions.

8. The method of claim 5, further comprising:
performing transmission resource detection and selection in a transmission resource pool for the first TB if the first counter value is equal to or greater than a predetermined number of retransmissions.

9. The method of claim 5, further comprising:
determining a second counter value according to a count of HARQ NACK feedback caused by the transmission resource collisions.

10. The method of claim 1, further comprising:
increasing a first counter value and the second counter value according to a present HARQ NACK feedback caused by a latest transmission resource collision if the first counter value is less than a predetermined number of retransmissions when transmitting the transmission resource collision report.

11. The method of claim 1, further comprising:
stopping the first timer when receiving feedback information associated with the transmission resource collision report and when the first timer is running, wherein the feedback information includes a new schedule grant, a transmission resource pool re-configuration, or both.

12. The method of claim 1, further comprising:
transmitting, to the second communication equipment, a new transmission resource collision report if no feedback information is received when the first timer expires.

13. The method of claim 12, further comprising:
stopping retransmission of the first TB if the count of transmission resource collision reports reaches a second threshold within a second duration; and
erasing the stored first TB if the count of the transmission resource collision reports reaches a second threshold within a second duration.

14. The method of claim 12, further comprising:
performing transmission resource detection and selection in a transmission resource pool for the stored first TB if the count of transmission resource collision reports reaches a second threshold within a second duration.

15. The method of claim 1, further comprising:
performing transmission resource detection and selection in a transmission resource pool for the first TB if no feedback information is received when the first timer expires.

16. A first communication equipment, comprising:
at least one memory; and
at least one processor coupled with the at least one memory and configured to cause the first communication equipment to:
receive first scheduling information;
determine whether there is a transmission resource collision of a first transport block (TB) and a second TB, wherein the transmission resource collision comprises the first scheduling information indicating to transmit the first TB and the second TB on the same resource at the same time;
store the first TB or the second TB for transmission if the transmission resource collision is determined, wherein:
the first TB is different from the second TB;
in response to the second TB having a higher priority than the first TB:
the second TB is transmitted for a first time based on the first scheduling information;
the first TB is stored and not transmitted based on the first scheduling information; and
the first TB is transmitted for the first time after the second TB is transmitted for the first time using a first autonomously selected resource selected by the first communication equipment based on a set of resources available for use by the first communication equipment and based on resources concurrently being used by other communication equipment; and in response to the first TB having a higher priority than the second TB:
  the first TB is transmitted for the first time based on the first scheduling information;
  the second TB is stored and not transmitted based on the first scheduling information; and
  the second TB is transmitted for the first time after the first TB is transmitted for the first time using a second autonomously selected resource selected by the first communication equipment based on the set of resources available for use by the first communication equipment and based on the resources concurrently being used by the other communication equipment;

transmit second information to a second communication equipment if the first TB is determined to be discarded, wherein the transmission resource collision occurs if the first transmission resource is the same as a second transmission resource;

transmit, to the second communication equipment, the transmission resource collision report if a second counter value is equal to or greater than a predetermined value within a first duration, wherein the transmission resource collision report includes a resource collision indicator, a schedule request, or both;

start a first timer when transmitting the transmission resource collision report; and stop transmitting HARQ feedback if the first timer is running.

* * * * *